(12) United States Patent
Hollar et al.

(10) Patent No.: US 12,112,224 B2
(45) Date of Patent: Oct. 8, 2024

(54) INTEGRATED CAMERA AND ULTRA-WIDEBAND LOCATION DEVICES AND RELATED SYSTEMS

(71) Applicant: Wiser Systems, Inc., Raleigh, NC (US)

(72) Inventors: Seth Edward-Austin Hollar, Raleigh, NC (US); Ryan Michael Tedrick, Raleigh, NC (US)

(73) Assignee: Wiser Systems, Inc., Raleigh, NC (US)

( * ) Notice: Subject to any disclaimer, the term of this patent is extended or adjusted under 35 U.S.C. 154(b) by 0 days.

(21) Appl. No.: 17/215,888

(22) Filed: Mar. 29, 2021

(65) Prior Publication Data

US 2021/0304577 A1  Sep. 30, 2021

Related U.S. Application Data

(60) Provisional application No. 63/001,695, filed on Mar. 30, 2020.

(51) Int. Cl.
*G06K 7/10* (2006.01)
*G06T 7/246* (2017.01)
(Continued)

(52) U.S. Cl.
CPC ..... *G06K 7/10306* (2013.01); *G06K 7/10356* (2013.01); *G06K 7/10415* (2013.01); *G06T 7/246* (2017.01); *G06T 7/292* (2017.01); *G06V 10/806* (2022.01); *G06V 20/52* (2022.01); *G06V 40/103* (2022.01); *G08B 13/19645* (2013.01); *G08B 13/2462* (2013.01);
(Continued)

(58) Field of Classification Search
CPC ........... G06K 7/10356; G06K 7/10306; G06K 7/10415; G06T 7/246; G06T 7/292; G06T 2207/30232; G06T 2207/30196; G06V 20/52; G06V 40/103; G06V 10/806; G06F 18/253; G08B 13/19608
See application file for complete search history.

(56) References Cited

U.S. PATENT DOCUMENTS 9,866,507 B2    1/2018  Frenkel et al.
10,071,282 B2 * 9/2018  DeAngelis ......... A63B 24/0062
(Continued)

OTHER PUBLICATIONS

International Search Report and Written Opinion, PCT/US2021/024653; Date of Mailing Jul. 8, 2021; 8 pages.
(Continued)

*Primary Examiner* — Kenny A Cese
(74) *Attorney, Agent, or Firm* — Stanek Lemon Crouse & Meeks, PA

(57) ABSTRACT

Real time location systems are provided including one or more ultra-wideband (UWB) sensors positioned in an environment; one or more image capture sensors positioned in the environment; and at least one UWB tag associated with an object in the environment to provide a tagged item in the environment. The one or more UWB sensors and the one or more image capture sensors are integrated into at least one location device. The at one location device includes a UWB location device, a combination UWB/camera location device and/or a camera location device. A location of the tagged item is tracked using the at least one location device. and wherein a location of the tagged item is tracked using the at least one location device.

19 Claims, 21 Drawing Sheets

(51) Int. Cl.
  *G06T 7/292*    (2017.01)
  *G06V 10/80*    (2022.01)
  *G06V 20/52*    (2022.01)
  *G06V 40/10*    (2022.01)
  *G08B 13/196*   (2006.01)
  *G08B 13/24*    (2006.01)

(52) U.S. Cl.
  CPC .. *G08B 13/248* (2013.01); *G06T 2207/30196* (2013.01); *G06T 2207/30232* (2013.01); *G08B 13/19608* (2013.01)

(56) References Cited

U.S. PATENT DOCUMENTS

| | | | |
|---|---|---|---|
| 10,176,379 B1 | 1/2019 | Barton et al. | |
| 10,333,568 B2 | 6/2019 | Alonso et al. | |
| 10,365,363 B2* | 7/2019 | Rohr | G01C 21/12 |
| 2011/0029278 A1* | 2/2011 | Tanigawa | G01S 5/0294 |
| | | | 702/150 |
| 2011/0134240 A1 | 6/2011 | Anderson et al. | |
| 2011/0135149 A1* | 6/2011 | Gefen | G01S 3/7864 |
| | | | 382/103 |
| 2011/0184685 A1* | 7/2011 | Tanigawa | G06V 20/36 |
| | | | 707/769 |
| 2018/0160081 A1* | 6/2018 | Ren | H04N 5/23258 |
| 2018/0241130 A1 | 8/2018 | Hollar et al. | |
| 2018/0329076 A1* | 11/2018 | Santangelo | G01S 5/0226 |
| 2019/0113979 A1* | 4/2019 | Tyagi | G06F 1/1694 |
| 2020/0228943 A1* | 7/2020 | Martin | H04W 4/80 |
| 2021/0235410 A1 | 7/2021 | Hollar et al. | |
| 2021/0243564 A1 | 8/2021 | Hollar et al. | |

OTHER PUBLICATIONS

Bazo Rodrigo et al: "Baptizo: A sensor fusion based model for tracking the identity of human poses", Information Fusion, Elsevier, US, vol. 62, Mar. 29, 2020, pp. 153-163.

Dibitonto Massimiliano et al: "Fusion of Radio and Video Localization for People Tracking", Nov. 16, 2011 (Nov. 16, 2011), SAT 2015 18th International Conference, Austin TX, USA, Sep. 24-27, 2015, pp. 258-263.

* cited by examiner

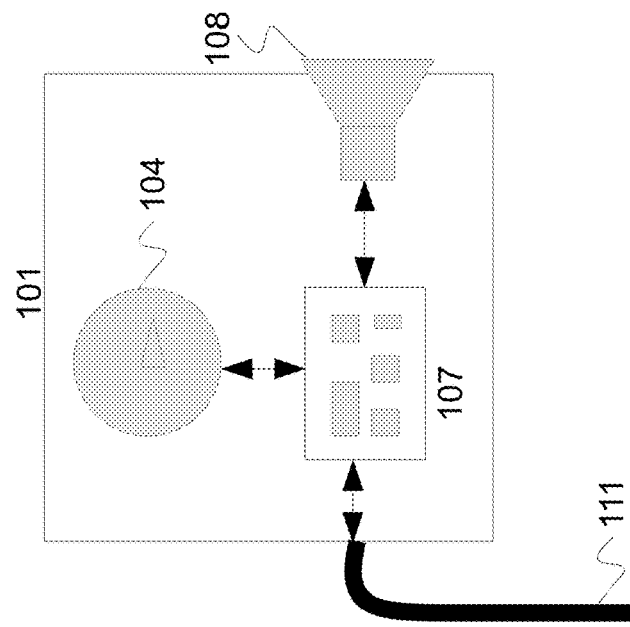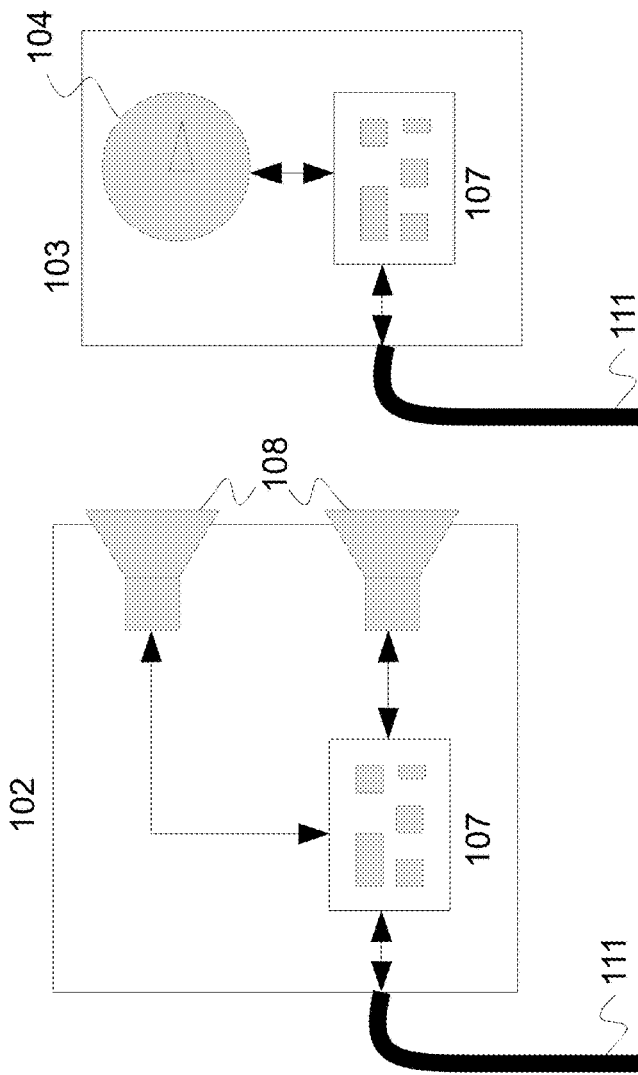

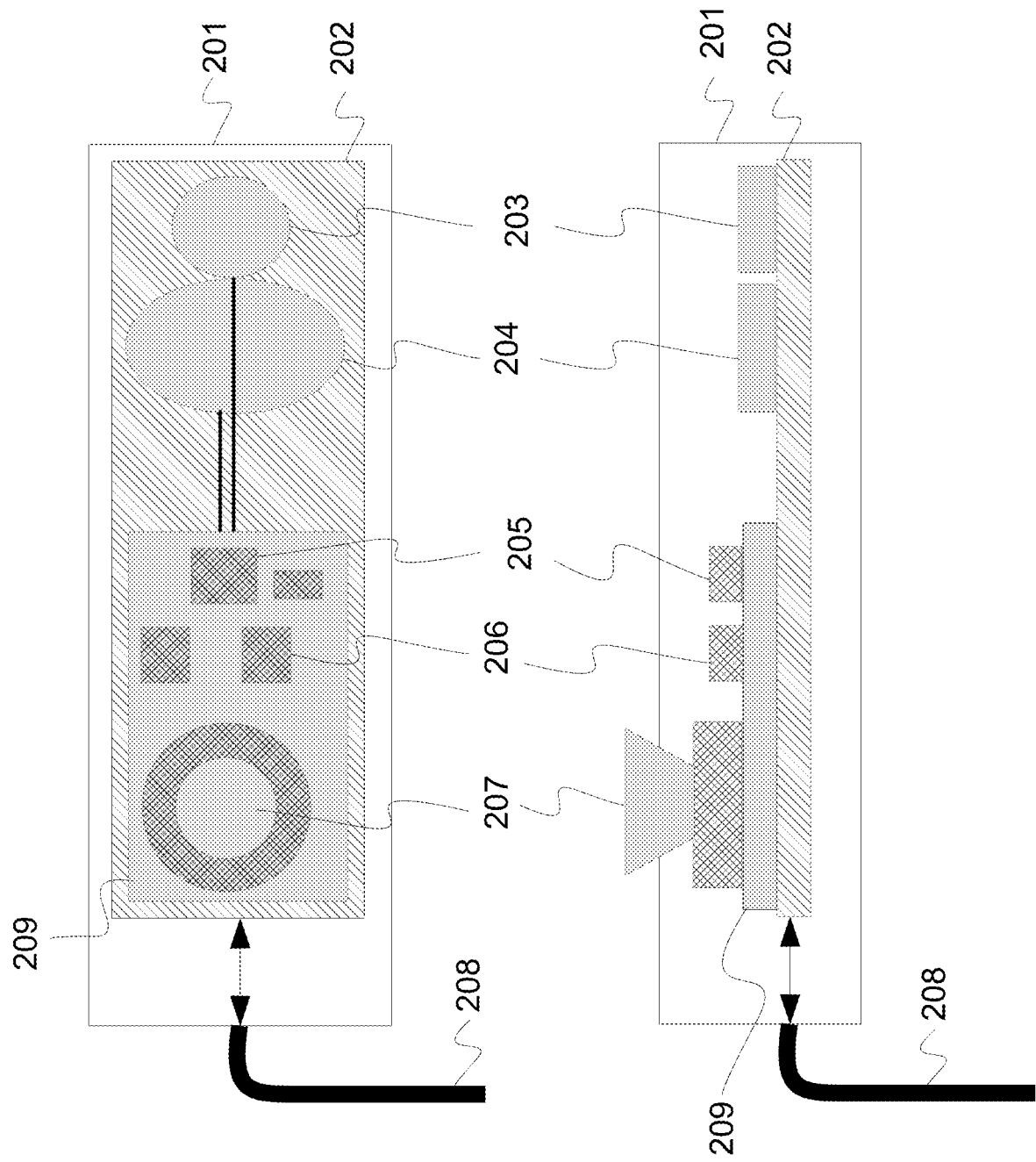

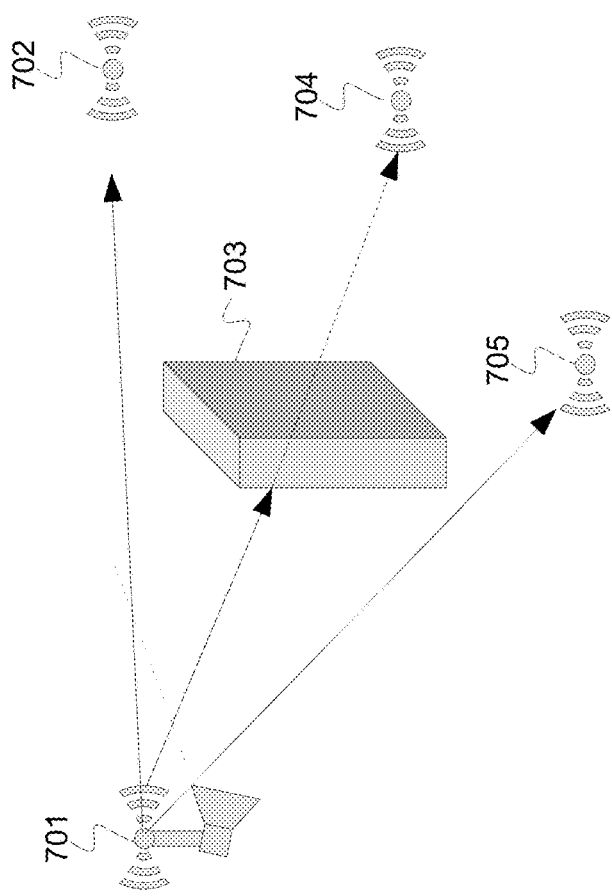
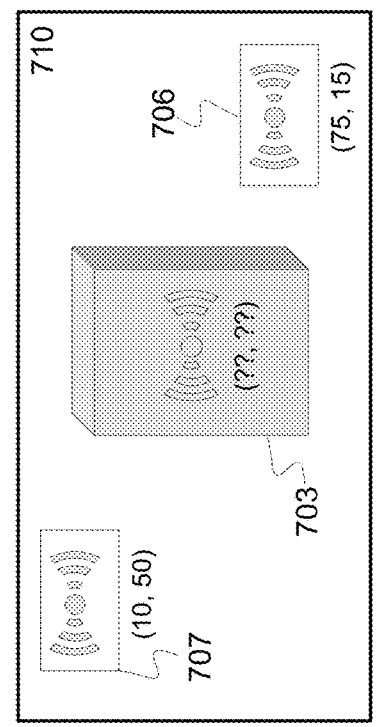
Fig. 7A
Fig. 7B

INTEGRATED CAMERA AND ULTRA-WIDEBAND LOCATION DEVICES AND RELATED SYSTEMS

CLAIM OF PRIORITY

The present application claims priority to U.S. Provisional Application No. 63/001,695, filed on Mar. 30, 2020, entitled Composite Camera and Ultra-Wideband (UWB) Real Time Tracking Systems, the content of which is hereby incorporated herein by reference as if set forth in its entirety.

FIELD

The present inventive concept relates to location systems and, more particularly, to real-time location systems (RTLS) using a combination of cameras and Ultra-Wideband (UWB) devices to track objects.

BACKGROUND

Real time location systems (RTLS) can provide what appears to be instantaneous location awareness to people and assets throughout a facility or environment. A number of technologies can be used as part of an RTLS solution. Passive Radio Frequency Identification (RFID) tags are low cost tags that can be affixed to assets. RFID readers are typically set up at choke points, forcing tagged items to go through one or more portals. Ultrasonic and infrared have also been used as a means for identifying people and objects with room-level accuracy. Active RFID tags allow greater range between the tagged item and the reader, decreasing hardware costs and simplifying installation. Cameras, too, provide a means to read barcodes which can be associated with positional information as well. As vision processing techniques become more accurate and reliable, camera-based obstacle detection systems are seeing a growing opportunity in the RTLS industry. Also a growing technology, UWB provides a means to determine the location of an RF tag with granular precision. UWB's inherent wideband signal allows for sharp transitions in the time domain. UWB receivers can then detect signal arrival times with a high level of accuracy, producing precise timestamps that translate to distances with centimeter-level accuracy.

SUMMARY

Some embodiments of the present inventive concept provide real time location systems including one or more ultra-wideband (UWB) sensors positioned in an environment; one or more image capture sensors positioned in the environment; and at least one UWB tag associated with an object in the environment to provide a tagged item in the environment. The one or more UWB sensors and the one or more image capture sensors are integrated into at least one location device. The at one location device includes a UWB location device, a combination UWB/camera location device and/or a camera location device. A location of the tagged item is tracked using the at least one location device. and wherein a location of the tagged item is tracked using the at least one location device.

In further embodiments, the UWB tag may be integrated into a separate device. The separate device may be one of a portable electronic device, a smartphone, a computer and a key fob.

In still further embodiments, the UWB tag may be affixed to the object. The object may include one of a stationary object and a moving object.

In some embodiments, the system may be configured to pair the UWB tag with the object using visual attributes and/or characteristics of the object.

In further embodiments, if multiple objects are identified within an image field of view of a camera image, an object that is closest to a location of the UWB tag within the camera image may be selected and paired with the object that is closest.

In still further embodiments, the system may locate a paired UWB tag in the environment using a UWB network associated with the UWB location device, a camera network associated with the camera location device and/or a combination of a UWB measurements from the UWB network and camera sensor data from the camera network.

In some embodiments, the object may include static attributes that do not change over time and a dynamic attributes that change over time. The system may continually update the changing visual attributes associated with the object to facilitate camera-based tracking and object recognition of the object.

In further embodiments, the system may updates the changing visual attributes of the object associated with the UWB tag by one of determining the location of the object associated with the UWB tag within a field of view of a captured image or video stream; identifying the location of the object associated with the UWB tag within the captured image stream using vision processing and a proximity to the UWB tag from the captured image; and extracting dynamic visual attributes of the object from the captured image to associate with the object using vision processing.

In still further embodiments, the changing visual attributes may be one or more of clothing type, clothing color, hairstyles, presence or absence of a head covering, type of shoes, eye color, shirt color, height, body shape, presence or absence of a beard and/or presence or absence of eyeglasses.

In some embodiments, one or more UWB location devices may be provided in a first portion of the environment and one or more camera location devices may be provided in a second portion of the environment, different and separate from the first portion of the environment. The one or more UWB location devices are used to track the tagged item in the first portion of the environment and the one or more camera location devices are used to track the tagged item in second portion of the environment.

In further embodiments, one or more UWB location devices and one or more camera location devices may be distributed in the environment such that the whole environment is tracked by the one or more UWB location devices and the one or more camera location devices.

In still further embodiments, the environment may include both an indoor environment and an outdoor environment.

In some embodiments, a type associated with the object may be unknown to the system and the system uses vision processing to determine the type associated with the object.

In further embodiments, the system may be configured to overlay a box around the object paired with the UWB tag on a captured image using vision processing; and project the UWB tag is projected onto the captured image and overlay a circle on the capture image, the circle having its center at a location of the UWB tag. The UWB tag associated with the box closest to the circle may be paired with the object.

In still further embodiments, the system may store visual attributes associated objects tagged in the system. A new object may be introduced into the environment and stored visual attributes of a pre-existing object match visual attributes of the new object the system may determine that then new object and the pre-existing object are a same object.

In some embodiments, the system may locate objects in a choke point between a first tracking area of the one or more UWB sensors and a second tracking area of the one or more image capture sensors. The first and second tracking areas are separate and distinct.

In further embodiments, the system may access external databases to identify the object in the environment.

In still further embodiments, the image capture device may be one of a charge coupled device (CDD), a LiDAR device and a CMOS chip and may sense light in one or more of the visible light range; the infrared light range and the ultraviolet light range.

In some embodiments, the UWB tag may include an enclosure including a processing unit and one or more sensors.

BRIEF DESCRIPTION OF THE DRAWINGS

FIG. 1A is a diagram illustrating a location device with incorporated camera sensors.

FIG. 1B is a diagram illustrating a location device with an incorporated ultra-wideband (UWB) radio frequency (RF) unit.

FIG. 1C is a diagram illustrating a location device that includes UWB RF unit and camera sensors in accordance with some embodiments of the present inventive concept.

FIG. 2A is a diagram of a UWB/camera location device illustrating a top-down view of an illustrative layout of components inside the location device in accordance with some embodiments of the present inventive concept.

FIG. 2B is diagram of a UWB/camera location device illustrating a side view of an illustrative layout of components inside the location device in accordance with some embodiments of the present inventive concept.

FIG. 7A is a diagram of an environment with a combined UWB/camera location device communicating with other devices in accordance with some embodiments of the present inventive concept.

FIG. 7B is a diagram of the camera's field of view illustrating items being recognized in accordance with some embodiments of the present inventive concept.

DETAILED DESCRIPTION

Figure 3:
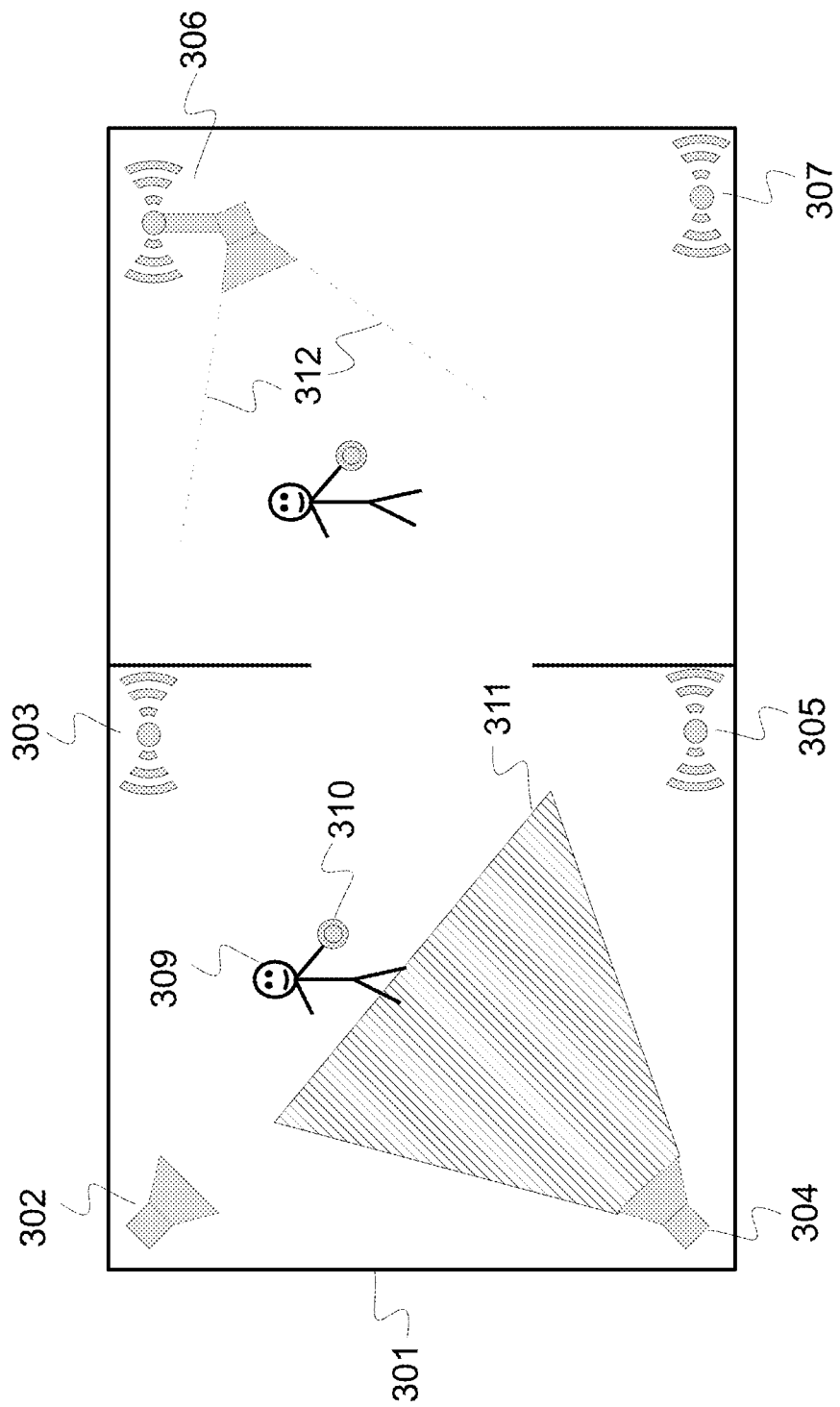
FIG. 3 is a diagram of an environment including camera location devices, UWB location devices, and combined UWB/camera location devices in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone, B alone: C alone; A and B only: A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed in the background, there are many types of location systems including camera bases systems and ultra-wideband (UWB) based systems. As both the camera obstacle detection and UWB solutions evolve, there are opportunities for combining these two unique sensor suites. For example, cameras do not necessarily require any items to be tagged, instead relying on the object's appearance for recognition. Furthermore, a camera system can detect visual attributes of the tracked object that may provide additional insight into the condition or nature of the object. UWB can operate through walls and obstacles and can detect items in visually obscured environments. Combined, they complement one another's capabilities, making a hybrid UWB/Camera RTLS more robust and flexible.

Accordingly, some embodiments of the present inventive concept combine the use of two tracking technologies into a single solution. Cameras can use vision processing techniques to track objects in their field of view(FOV), and UWB networks can track tags within their network. In this context it should be understood that, as used herein, a "tag" is not strictly a standalone device in the traditional sense of radio frequency (RF) tags, but could also be any device capable of generating RF signals in the proper band, such as a smartphone, computer, tablet, and the like. Some embodiments discussed herein utilize the capabilities of both camera and tag tracking to produce a reliable RTLS tracking solution.

The term digital image processing (or simply "image processing") is a process in which one or more sequential images are processed. Specifically, "data" representing the image is consumed and processed. The output of processing can yield an altered image or video, but does not have to. Image formatting, balancing the color and brightness from the sensors, and image encoding may all be considered "image processing."

For example, image processing can be used to change the image format from a bitmap format to a portable network graphics (.png) format. In working with a sequence of images, a video stream composed of a sequence of images, can use image processing to encode a video into a specific format, for example, moving picture experts group (.mpeg) format. More sophisticated image processing techniques can be used to interpret the activities or environment represented within the image itself. As used herein, "computer vision processing" (or simply "vision processing") refers to how images and videos can be processed to decipher a higher level understanding within the images and videos. For example, object recognition methods applied to images can identify objects and shapes within images. The same object can be identified from one image to the next to decipher motion tracking. Using computer vision processing, not only can objects be recognized but also visual attributes of the objects can also be extracted. In general, vision processing is defined as a type of processing which provides a higher level understanding within the images and video themselves where object recognition and classification is a subset thereof. As a starting point, refer to FIGS. 1A, 1B, and 1C, which illustrate example diagrams of location devices with their associated components.

Referring first to FIG. 1A, the diagram illustrates a camera location device 102 with one or more camera sensors 108. In some embodiments, the light conversion device within a camera sensor 108 could be a charge coupled device (CCD) or a complementary metal-oxide-semiconductor (CMOS) chip. In some embodiments, the cameras sense in the visible light range. In further embodiments, the cameras sense in the infrared or ultraviolet light range. Some embodiments have two or more cameras with overlapping fields of view (FOV). The camera location device 102 uses stereo vision methods to extract depth from objects within the image. In further embodiments, the cameras can operate in different bands of the electromagnetic field (EMF) spectrum, for example, one camera in the visible band and one in the infrared band.

In some embodiments, the camera sensor is a scanning light detecting and ranging (LiDAR) unit. LiDAR is a method by which distance is measured by measuring the time it takes for a laser pulse to travel to an obstacle and reflect back. A scanning LiDAR unit measures distance from a plurality of points over a specified angular area or volume. A scanning LiDAR unit may be a rotating device with multiple beams. In some embodiments, it may be a solid-state LiDAR with no rotating pieces but whereas the beam is directed electronically. The term "camera sensor" may be defined within the context of the present inventive concept to include scanning LiDAR units and should not be narrowly defined to be what a camera is traditionally thought to be. Like a CMOS camera image, the LiDAR sensor image is an array of data. In these embodiments, the array of data is considered the image, and the data of individual points or "pixels" can be both distance measurements and object reflectivity.

Referring again to FIG. 1A, whether the camera sensor is a LiDAR unit or a more traditional passive light receptor, the output of the camera sensor produces images and frame data. The image and/or frame data from the camera sensor is sent to the processing unit 107 where it is processed and further sent along through, for example, a data cable 111. As used herein, a "frame" is simply an image from a sequence of images. Video is composed of a sequence of images and an individual image in a video are often referred to as a frame of the video. In some embodiments, the cable 111 could pass just data with a separate power. In further embodiments, the data cable could have power incorporated into it, thus passing both power and cable. For example, the data cable 111 could be a universal serial bus (USB) cable or a power over ethernet (POE) ethernet cable. In some embodiments, data could be sent wirelessly if the processing unit 107 also incorporated a means to transmit data wirelessly and, thus, the cable 111 may be eliminated in these embodiments. For example, wireless fidelity (WiFi), cellular, and Bluetooth are all examples of a means of transmitting data wirelessly.

A distinction should be made between "image data" and "frame data" from the camera sensors 108. Frame data typically implies that images are coming from the camera sensors 108 at a steady rate and can be measured in frames per second. For example, frame data could be sent from the camera sensors 108 at a rate of 10 frames per second. Image data, on the other hand, refers to a single image as a part of the frame data. Alternatively, a single image of data may be captured in which case there is no implication regarding a steady stream of frame data. Image-data capture may also be triggered by the processing unit 107 on a per-image basis, whereas frame-data capture may be started by the processor unit and continued until instructed to stop. The camera devices 108 may be configured to send data either as frames or as separate images. The processing of the camera sensor data could either occur within the processing unit 107, and the condensed data could then be sent on through data cable 111, or data could be sent unprocessed directly. In some embodiments, there is a need to compress the data to reduce the data bandwidth that the data cable 111 must handle. In some embodiments, data may be sent wirelessly, and the data cable 111 may not be used at all. In some embodiments, the camera location device 102 is battery powered. When battery powered, the device may only capture periodic images. Processing of the images may happen on the processing unit 107 to reduce data size and hence reduce the transmission time (either wirelessly or wired) of the image data. Reducing the time of transmission, especially wirelessly, may have a beneficial effect on the overall power savings. The processing unit 107 may include, for example, a hardware image encoder/compressor, which could be used to reduce transmission size. Vision processing may occur external to the device.

The camera sensors 108 may use different lenses or be oriented in different directions to more fully capture the surrounding viewing area. A fisheye camera lens, which captures more of panoramic view, could be used. A motorized end effector could be connected to the camera sensors 108 to rotate the camera to view different areas of the environment in some embodiments.

Referring now to FIG. 1B, a location device 103 with a UWB unit 104 will be discussed. In some embodiments, the location device 103 may be similar to devices discussed in, for example, U.S. Pat. No. 10,462,762 B2, entitled Methods for synchronizing multiple devices and determining location based on the synchronized devices, and United States Patent Publication No. 2018/0294565 A1 entitled Ultra-Wideband (UWB) Antennas and Related Enclosures for the UWB Antennas, the disclosures of which are hereby incorporated herein by reference as if set forth in their entirety. The UWB location device 104 is described as a part of the whole UWB/camera system solution. The UWB unit 104 receives/transmits UWB radio frequency (RF) signals and performs one or more of the following: measuring time of flight (ToF), measuring angle of arrival (AoA), and/or measuring RF arrival timestamp. This data is processed through the processor unit 107 and can be retransmitted using methods similar to those discussed above with respect to FIG. 1A. The system can transmit data wirelessly or through the wired data connection 111, for example. The UWB location device 103 could also be powered by battery or alternatively through a separate cable or through a combined data/power cable 111.

Referring now to FIG. 1C, a system combining the UWB/camera location device aspects of both FIGS. 1A and 1B will be discussed. Camera sensor 108 and UWB unit 104 are part of the UWB/camera location device 101. In some embodiments, more than one camera sensor/UWB unit can be included without departing from the scope of the present inventive concept. Like the location devices 102 in FIG. 1A and 103 in FIG. 1B, the method and system for data transfer and power sources apply to location device 101 as well. The UWB unit 104 may include more than one UWB antenna, especially in the case where AoA measurements are performed. In some embodiments, a location device may only need a single UWB antenna if said antenna is isotropic and has a mostly uniform antenna pattern. In embodiments where the UWB antenna is anisotropic and the antenna pattern is directional, multiple antennas can be added to improve reception from different directions. In some embodiments, the UWB unit(s) 104 or the UWB antenna(s) may be outside of the enclosure of the processing unit 107. These UWB units/antennas may be connected by a cable and need to be mounted separately from the enclosure of the processing unit 107. Likewise, the camera sensors 108, too, may be distinct units that can be connected to the processing unit 107 through a cable. Such a cable connection for either the UWB unit 104 or the camera unit 108 could be a USB cable, a serial cable, or an ethernet cable. Alternatively, a wireless method such as Bluetooth or near field communications (NFC) could be used in place of the cable to send data to/from 108/104 to the processor 107.

Referring now to FIGS. 2A and 2B, a layout structure of example UWB/camera location devices will be discussed. It will be understood that FIGS. 2A and 2B are provided as examples only and that the layout of location devices are not limited to the configuration illustrated therein. Many other combinations and layouts of elements of the location devices are possible. As illustrated, the enclosure 201 surrounds the electronics, and a printed circuit board (PCB) 202 is the substrate on which most components are affixed. A data/power cable 208 is further connected to the device. The UWB antenna consists of radiating elements 203 and 204, though in other embodiments, the number of radiating elements and their shape and size could be different. In some embodiments, the radiating elements may include copper plating layer(s) as part of the PCB 202. In further embodiments, the UWB antenna could be external to the enclosure 201 and be connected separately through, for example, a subminiature version A (SMA) connector. The area marked by 209 represents the area where active electronics are located. The component 205 nearest the UWB antenna could represent the UWB transceiver circuits. There is a processing element 206 included within the circuitry as well. The camera sensor 207 is shown mounted directly to the PCB. In these embodiments, all the components are assembled directly onto a single PCB for ease of manufacture. It will be understood that FIGS. 1A-C and 2A-B are provided as examples only and, therefore, embodiments of the present inventive concept are not limited thereto. Elements may be added or removed from these systems without departing from the scope of the present inventive concept. Additional embodiments, for example, do not restrict all components to be attached to a single PCB.

A UWB/camera RTLS network will now be discussed. To create the RTLS network, UWB, camera, and UWB/camera location devices are distributed throughout a facility. The UWB units capture UWB related location data while the cameras capture images, video feeds, or a combination of both. The combination of the two types of sensors, UWB and camera, allows the system to track both in places where visibility is hampered but also in places where RF communication may be limited, providing overall for a more robust tracking solution. The "tracked item" has a UWB tag affixed thereto. As used herein, the "tracked item" or items refers to the person or thing being tracked using the combination UWB/camera location device in accordance with some embodiments of the present inventive concept. For example, the tracked item could be a stationary object, for example, a box, pallet, tool, bag, plants, and the like or alternatively it could be a moving object, such as a person, animal, car, drone, and the like. At some point the system pairs the UWB tag with the visual attributes or characteristics of the object. This pairing can happen initially upon attachment of the UWB tag to the object, or it could happen during the tracking itself. Once paired, the object can either be located with the UWB network, located with the camera network, or located using a combination of UWB measurements and camera sensor data.

In some embodiments, the tagged item is an object that has a static appearance, i.e., does not change from day to day. For example, a box in a warehouse may not change from day to day, or even week to week. However, in other instances, the tagged item may change in appearance from day to day. One example may be a pallet in a warehouse. An empty pallet may look very different than a full pallet, and a pallet full of items may look very different than the same pallet full of different items. In these embodiments, there is a distinction between "static" appearance of the tracked item and "dynamic" appearance of a tracked item. In some embodiments discussed herein, the methods in accordance with the inventive concept continually update the visual attributes of the tracked item to facilitate camera-based tracking and object recognition of items whose appearance is dynamic.

For example, a worker may be outfitted with a UWB tag. When the worker initially enters a room which is covered by both camera and UWB location devices, the system processes images from camera sensors using object recognition algorithms. The result of the object recognition may enable the system to identify the person. Because the appearance of the worker may change from day to day, for example, different clothing, different hairstyles, and the like. The camera system may be able to recognize that there is a worker, but it may not be able to accurately recognize who the worker actually is. To aid in identification, the system may pair a UWB tag with the person's visual appearance. This may be done by locating the UWB tag in the vicinity of a recognized object from the camera sensors. Once paired, the camera network can maintain a list of visual attributes of the person and allow the tracking system to reliably track the person for the rest of the day.

Referring now to FIG. 3, a layout of a facility 301 with location devices dispersed throughout the facility will be discussed. As illustrated, the facility 301 includes three UWB-only location devices 303, 305, and 307; two camera-only location devices 304 and 302, and a single UWB/camera location device 306. It will be understood that the facility 301 may include more or less of the various location devices without departing from the scope of the present inventive concept. The area 311 is an example of a viewable area that a camera 304 may have. For purposes of the present specification, the "coverage area" 311 will be demarcated by hashed lines. For example, the visual coverage area of the camera of the UWB/camera location device 306 is denoted by the dotted lines 312. The desired item to be tracked is a person 309 in this example. The person has a UWB tag 310 associated with or attached to them. As the person 309 traverses the facility 301, both camera sensor data and UWB location data is captured and processed. As discussed above, embodiments of the present inventive concept may provide different combinations of Camera, UWB, and Camera/UWB devices. For example, in some embodiments, there may only be Camera and UWB devices and no Camera/UWB devices; only UWB and Camera/UWB devices, and no Camera devices, and the like.

"Location devices" as discussed herein can take different forms. A solution can be a combination of camera (sensor) only, UWB only, and UWB/Camera location devices. A camera only location device could be as simple as a security camera with a video feed into a processing unit. A USB Camera attached to a computer could also serve as a camera only device. A smart phone using only its camera (or cameras) could also be considered a camera only location device. UWB devices already exist. Some include the ability to interface over USB. Others can interface over ethernet and PoE or Wi-Fi. Some devices can be mounted inside or outside building walls. Some devices could be on vehicles for tracking around the vehicle. Smart phones could also behave as UWB/camera location devices. Location devices could be either fixed and mounted or they could be mobile attached to a car, golf cart, a person, a pet, and the like. Location devices could also be tags in addition to devices. Typically, UWB location devices have the RF capability to be treated like a UWB tag as well.

Figure 4:
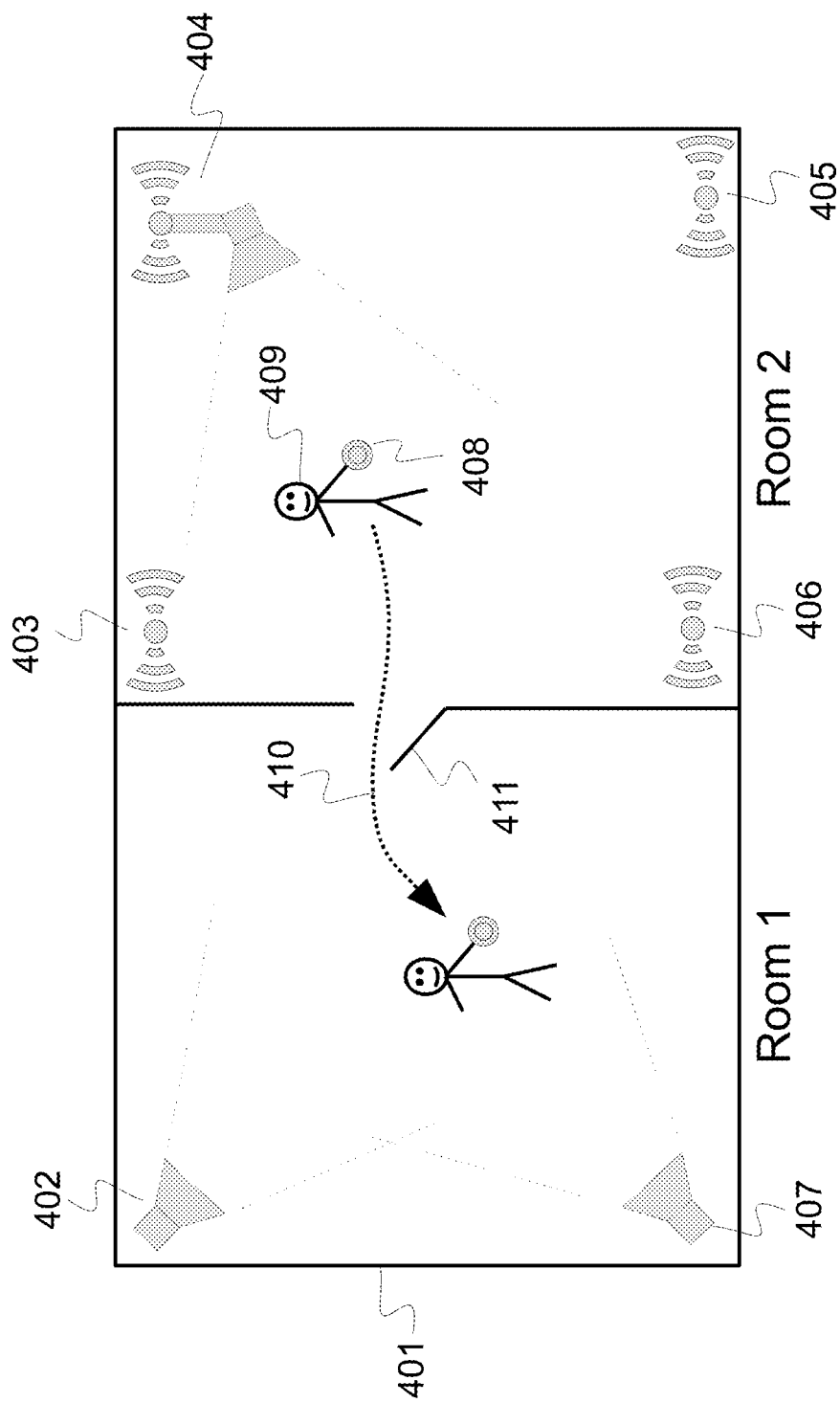
FIG. 4 is a diagram of an environment with location devices illustrating movement of a tagged item in accordance with some embodiments of the present inventive concept.

Referring now to FIG. 4, a person 409 traversing a facility 401 in accordance with some embodiments of the present inventive concept will be discussed. As illustrated in FIG. 4, location devices (402, 403, 404, 405, 406, 407) with differing sensor arrangements are distributed throughout the facility. The camera/UWB location device 404 captures video of the person 408 in room 2 as he/she follows the path 410. Eventually, the person 409 goes to Room 1, and the camera sensor from 404 is no longer capable of seeing the person 409. Furthermore, the UWB location devices (403, 404, 406, 405) are located in Room 2. When the UWB tag 408 is moved to Room 1, the attenuation of RF signals through the walls between the two rooms may prevent the tag 408 from communicating with the UWB location devices in Room 2. Therefore, the UWB-based system may not be able to determine the location of the UWB tag 408 when the person 409 walks into Room 1. Once in Room 1, however, the camera location devices 402 and 407 can capture video of the person 409 directly.

Video capture of people, in and of itself, does not imply that both identification and location of a person can be deciphered. Numerous vision processing methods exist, however, to identify and classify objects from video streams and images. Conventional algorithms can accurately categorize and identify the type of object, for example, is the object a person or not, but may not have the level of intelligence to identify who the person is. Types as used in reference to embodiments of the present inventive concept refer to objects that are similar in nature and can be grouped accordingly. For example, types of objects could refer to "people," "cars," "cats," "tables," and the like. In other words, the type can refer to essentially any groups of objects that can be categorized based on visual attributes. A camera sensor may not readily be able to identify uniquely who the person is or which specific car it is, but can identify that it is a person or that it is a car. Consider a camera mounted 15 feet above the floor on a wall looking out over a large facility. It is unlikely the camera will be close enough to capture individual facial features, making positive identification of the individual difficult to do. With clothing varying from day to day, identification based on color may not be possible either. Hats, caps, or shoes may change from day to day as well, making it difficult to rely on those visual markers from one day to the next.

Referring again to FIG. 4, video footage of person 409 may be initially captured from the camera sensor from the location device 404. Furthermore, the location of UWB tag 408 is also known from the UWB sensor collected by the UWB enabled location devices. Assuming the camera sensor's field of view and orientation are known, the tag's location can be mapped to a position within the camera sensor's captured image. Furthermore, the person 409 also appears in the image. The image can be searched for objects using vision processing. Furthermore, vision processing can classify them accordingly. In embodiments illustrated in FIG. 4, the person 409 is recognized in the image and classified as a person object. The system can then associate the closest person object in the image to the UWB tag. Furthermore, the temporal features (visual attributes) of the person, for example, color of clothes, hat, hair color, shoe color and the like, can be captured and recorded. Once the person 409 walks from Room 2 to Room 1, the UWB tag 408 is out of range, and the UWB system can no longer determine the tag's location. The camera location devices 402 and 407, however, capture images of the person 409. Since the person's visual attributes were previously captured, the system applies algorithms/rules to search for visual attributes. If the visual attributes match those attributes of a person object which the system previously recorded, then a positive identification of the person can be made. In so doing, the system may recognize that this is the same person 409 with UWB tag 408 from Room 2 that is now in Room 1, even though the UWB tag 408 is not contributing to the location determination.

Methods for identifying location using multiple cameras in accordance with some embodiments of the present inventive concept will now be discussed. As the two camera location devices 402 and 407 capture images of the person simultaneously, vision processing can be used to determine the person's location within the images of the two cameras. Since the cameras' locations and orientations are known, the location of the object can be calculated using, for example, computer vision triangulation. As discussed herein, computer vision triangulation refers to the process of determining a point in three dimensional (3D) space given its projections onto two, or more, images. With the object's projection being known within camera sensor 402 and 407, the 3D location can be determined, accordingly. In most cases, triangulation generally requires that the camera sensors' locations and orientations be known. Calculations typically use matrix mathematics to determine the object's location in 3D space. In some embodiments, a restricted version of triangulation calculates an object's location in two dimensional (2D) coordinates. This is simply a subset of the 3D solution with a restriction on one of the dimensions. For example, one may assume that the object is at a fixed height above the floor and set the z dimensional to a fixed value.

Figure 5:
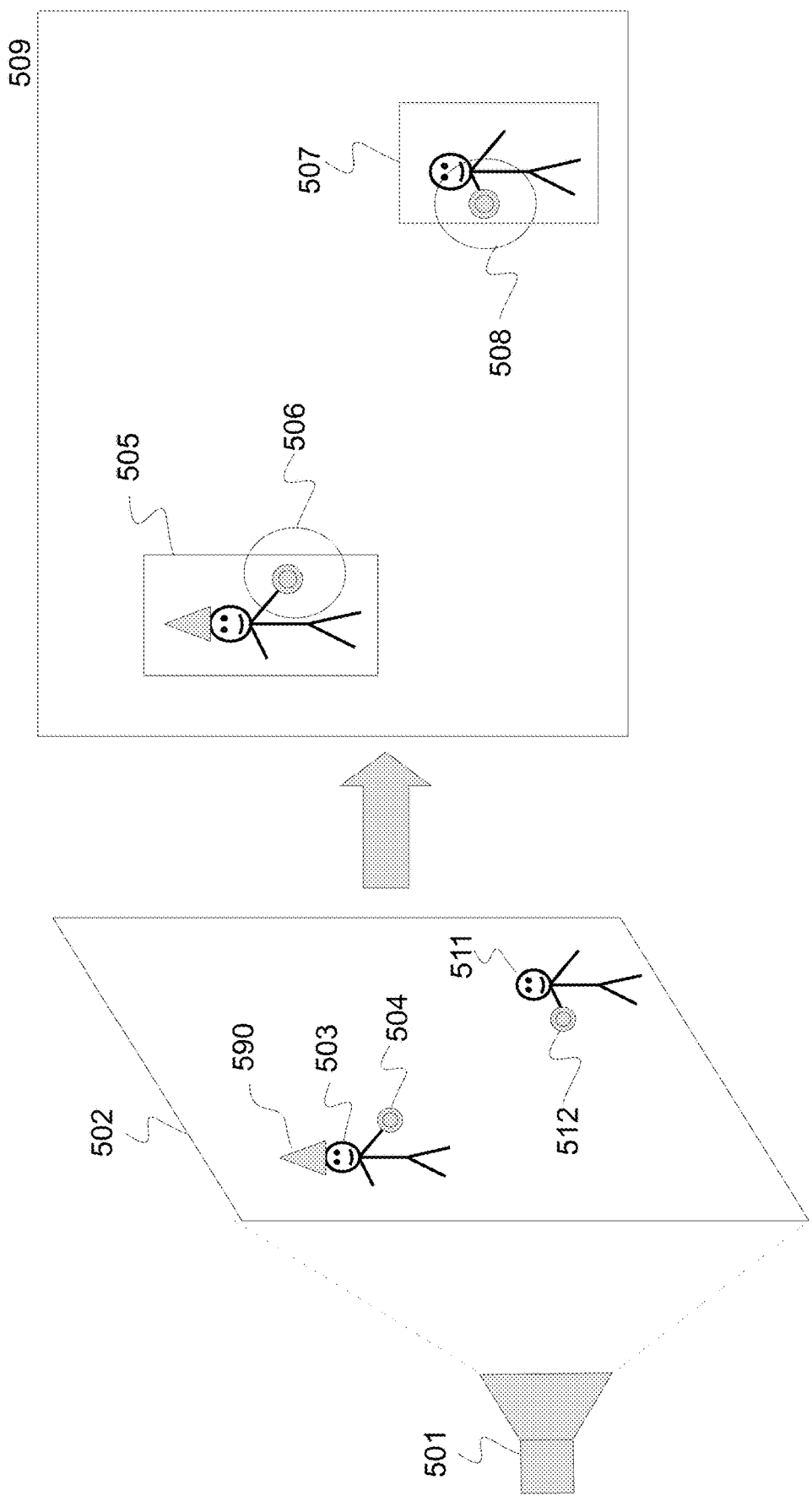
FIG. 5 is a diagram illustrating items being tracked within a camera's field of view in accordance with some embodiments of the present inventive concept.

Referring now to FIG. 5, pairing of a UWB tag with an object in accordance with embodiments of the present inventive concept will now be discussed. In particular, FIG. 5 illustrates pairing of a UWB tag to an object identified by the camera sensor. As illustrated, camera 501 is affixed to a wall overlooking a facility and captures an image 502. The image shows two people 503 and 511 where person 503 is wearing a hat 590. These two people are each holding a UWB tag 504 and 512, respectively. It should be understood that although the UWB tags are shown as visible, this is not necessarily the case. For example, the UWB tags could be inside the person's pants pocket, or worn as a lancet around the neck under the shirt. The UWB RTLS network does not need the tag to be viewable visually to determine the location. The UWB RTLS solution identifies the location of the UWB tags 504 and 512 and ascribes a 3D location to each tag. A computer vision objection recognition module applies algorithms to the image 502, and the results are shown in the processed image 509. The rectangles 505 and 507 show the identified person objects (objects that are people) from the vision processing algorithm. Furthermore, the location of the UWB tags 504 and 512 have been projected onto the image and are shown with circles 506 and 508.

In the processed image 509, the circle 506 of the projected tag overlaps with the rectangle 505 of the person object. That is to say that UWB tag 504 is in close proximity to person 503. With no other person objects nearby, the system can positively associate UWB tag 504 with person 503. Likewise, the system associates UWB tag 512 with person 511. To associate a tag with a person object means that the system can now consider them to refer to the same entity. Data associated with the UWB tag can be merged with the location and visual data of the object from the camera sensors. Once the system does this association, essentially pairing an individual tag with an individual person object, visual attributes of the object can be combined with the properties from the UWB tag. For example, the system identifies that person 503 is wearing a hat 590 and that person 511 is not wearing a hat. Furthermore, the system maintains properties of UWB tags, and UWB tag 504 has a property "name" whose value is "Tom." UWB tag 512 has a property "name" whose value is "Jerry." With the association of tags to person objects, the system determines that "Tom" is wearing a hat 590 and "Jerry" is not wearing one. The visual attributes could be dynamic (temporal) in nature, too. While "Tom" may be wearing a hat one day, he may not be wearing one the next day. The system can update and perform an association as the opportunity arises to keep the list of visual attributes up to date with the tag properties. Although this example discusses the physical attributes of the person objects 503 and 511 associated with UWB tags 504 and 512 it should be understood that the tags could be affixed to non-human entities as well and their visual properties could be discerned using the vision system.

Visual attributes of a person object can also be used to identify the location of the UWB tag and hence enable tracking without relying on the UWB network. For example, consider a camera sensor that operates in an area without a UWB RTLS network. The camera captures an image and recognizes people objects. The system extracts visual attributes of the recognized people objects. The system also maintains a list of UWB tags which may also contain associations with people objects and their visual attributes. If the visual attributes from the currently recognized person object matches those from a previous association with a tag, then the system may make the determination that the person object is one and the same. Furthermore, if the same person is recognized in two or more camera sensors then computer vision triangulation can determine a location of the person and, because of the association, update the UWB tags location as well.

In some scenarios, the area covered by the UWB RTLS network and the area covered by the camera network might not overlap at all or very little. Consider an environment with known choke points. As used herein, a "choke point" is a pass-through point that connects two areas together. For example, consider two rooms connected by only one doorway. The doorway is considered a choke point because in order to go from one room to the next, one must always go through the doorway. In the case of UWB networks and camera sensors, choke points can be useful locations to do associations between UWB tags and the objects that are tagged. When a person or object goes through the choke point, the system could immediately recognize the object and associate visual attributes with the associated object. If the UWB network tracked within or up-to the choke point, then the UWB tag identifier could be associated with the visual attributes of the object as well. FIG. 4 partially demonstrates this scenario. In Room 1, there is a camera-only network, and in Room 2, there is a UWB tracking solution. The choke point is the doorway 411 that the person 409 walks through. At the point the person goes through the doorway, the camera system can grab images of the person object and associate visual attributes to the UWB tag identifier.

An extension to these embodiment is discussed below. Methods have been discussed herein for associating a tag with visual attributes of the tagged object. This was done by pairing a tag with a recognized object and then extracting the visual attributes. In some embodiments, the visual attributes can be determined as part of an initialization step when the UWB tag is first assigned to the object. During this process, a camera may initially capture the visual attributes even before the tag is added to the object. Alternatively, a camera may not be used, and a user may simply input visual parameters manually. Examples of visual parameters may be classification, size, color, and the like. Even more details of visual attributes could be captured for people. For example, hair color, eye color, shirt color, height, body shape and the like. In some cases, visual attributes may be available already and could be pulled from a database. For example, an automobile driver's license data which contains hair color, eye color, and height. Regardless of how the initial visual attributes are captured, the UWB tag's unique identifier serves as a look up reference to the tagged object's properties and within these properties the visual attributes can be saved. The UWB tag's unique identifier could be a media access control (MAC) address, for example. Alternatively, the unique identifier could be something that exists only temporally, like a session ID that only exists as long as the object is associated with the tag. The UWB tag's identifier further serves as the common ID to gather UWB raw location data, i.e. ToF, TDOA, AoA, and the like, to aid in the calculation of the location of the object.

A smart phone is a special case of a UWB/camera location device. Recently, UWB technology has been embedded in smart phones, and it would be unsurprising to see such solutions becoming common place in the near future. Smart phones also have camera sensors embedded in them as well. Therefore, smart phones can use UWB technologies and camera sensors to do novel types of tracking and identification in accordance with some embodiments of the present inventive concept.

Figure 6:
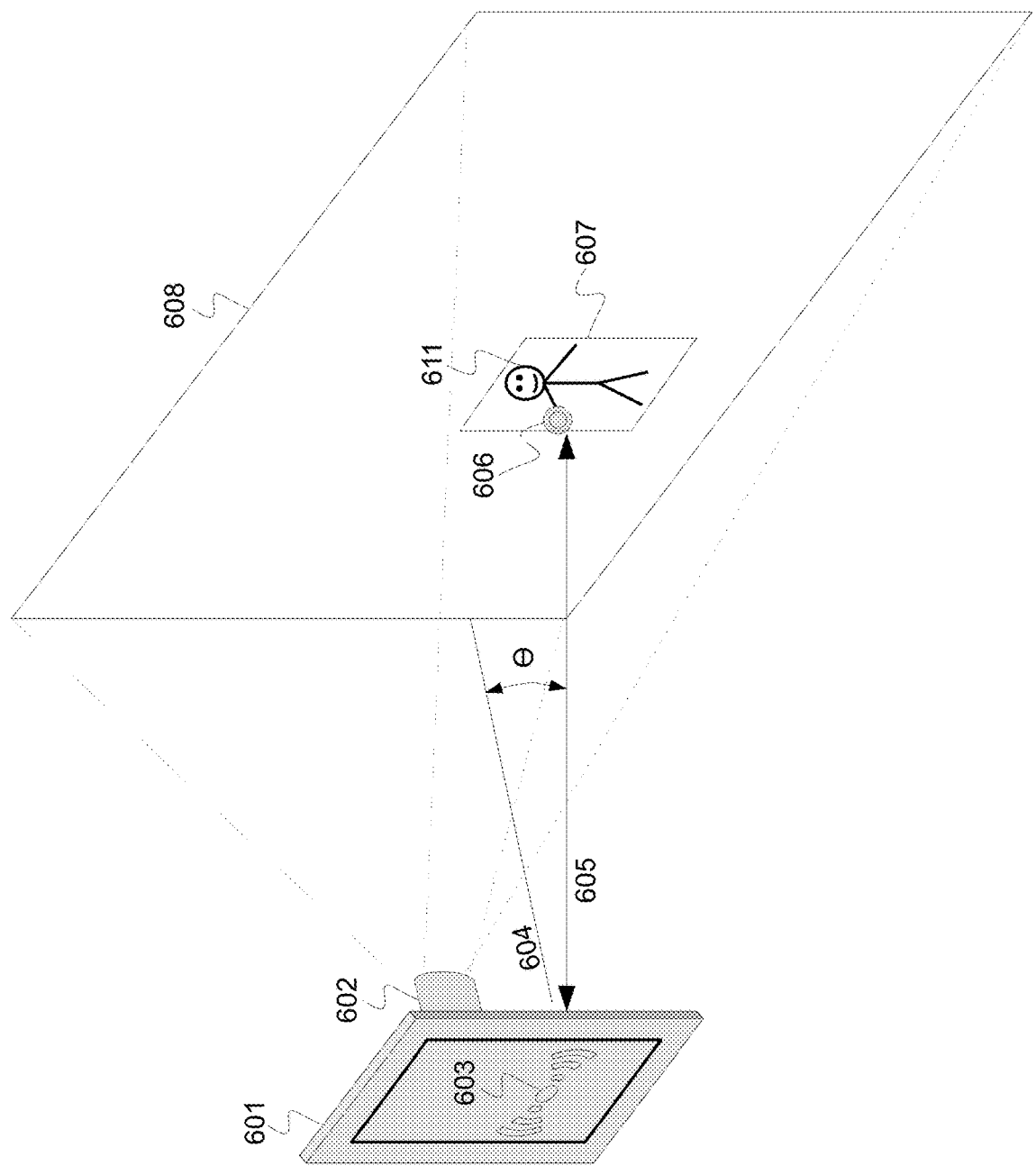
FIG. 6 is a diagram illustrating a smartphone being used to track an item in accordance with some embodiments of the present inventive concept.

Referring now to FIG. 6, a diagram of a smart phone 601 (smart device) and its camera sensor's viewing area will be discussed. The smart phone (smart device) 601 contains both a UWB tracking unit 603 and a camera senor unit 602. The camera sensor 602 is viewing an area and captures an image 608. The phone working alone or in tandem with other location devices is able determine the location of UWB tag 606. The UWB tag 606 could be another smart phone user, for example. Furthermore, the system can project the UWB tag 606's location within the image 608. The computer vision object recognition module is configured to identify a person object 607, and the UWB tag 606 is associated with the person 611 within the person object 607. The UWB tag 606 identifier can provide identification of the person 611 itself. Now, the system can capture visual attributes of person 611 and record them for other camera location devices to use in identification of the person without the future need of the UWB RTLS network.

In some embodiments, the actual location of 606 may not be visible, however its location within the 2D frame of the image is overlaid onto the image 608. Then the user can use the phone in an augmented reality context to find the tag. For example, someone may lose their tag and use their phone to locate it. It can be seen that the tag is located 16 meters away through a wall. Once present in another room and it can be seen that the tag is located 2 meters away in the couch. Using this sort of incremental search, the user can find the tag.

Referring again to FIG. 6, methods for determining relative location of the UWB tag 606 will be discussed. The UWB location unit 603 performs an AoA measurement from the tag's 606 signal and determines the angle to be $\theta$. The camera 602 is almost co-located with the UWB location unit 603. Given their co-location, it may be possible to map the angle $\theta$ to a specific subset of the image captured by the camera. Each camera's image's pixel refers to a specific angular direction from the camera. With the co-location of the UWB location unit 603 and the camera 602, the angle $\theta$ can be ascribed to a pixel location or specific set of pixel locations. Therefore, the relative location of the tag 606 can be determined and overlaid on the image 608. To further correlate or affirm the location of the tag on the image, a ToF measurement can be made to measure the distance 605 between the phone and the tag 606. This could also address offset errors in the co-location of the UWB location unit 603 with the camera 602.

Knowing the distance 605 between the device 601 and the tag 606 may not even be necessary to map the tag 606 on the image 608, since depth is generally not a necessary parameter for performing the tag mapping when the camera unit and UWB unit are collocated.

Furthermore, it should be noted that while the previous examples have described people as being the tracked items, the methods and solutions also apply to non-person objects/items as well. If a variety of objects are being tagged such that they can eventually be visually discriminated, the process for recognizing and extracting attributes is the same. For example, if two items are tagged, and one item is a box, and another item is ball, the system can initially identify and classify a generic object, and then afterward, seek to extract attributes, for example, square or round, color, and the like.

Health monitoring of a network will now be discussed. UWB/Camera RLTS solutions can also be used to monitor the health of their network. With the ability of camera sensors to see other location devices, the system decides, for instance, if there are obstacles impeding the sensor measurements that may degrade performance, or if a location device has been damaged or removed. For example, a ladder may have been placed directly on top of UWB location device affecting its ability to measure tag data. A camera/UWB location device may use its camera to determine that a ladder is in the way.

As an additional feature, the RTLS solution can use both UWB location and camera sensor based recognition to identify the location of other location devices in the network. During installation of a RTLS network, it is often critical to determine the location of the location devices so that the location solver can accurately resolve location of the tags. Some solutions involve manual measurement with a tape measure or laser range finders. Some UWB systems use the UWB antennas themselves taking ToF measurements to determine the distances between the antennas. In some embodiments of the present inventive concept, camera location devices can be used to help identify the placement of other location devices helping to configure the RTLS network. Using vision processing, the location device objects can be identified in images, and the pixel location along with other location sensor data can be used to determine the location of the location devices.

Referring now to FIG. 7A, a system including an obstacle in accordance with embodiments of the present inventive concept will be discussed. As illustrated, a UWB/camera location device 701 can communicate with UWB location devices 702 and 705, however, an obstacle 703 is preventing communication with UWB location device 704. The location device's 701 camera sensor captures an image of the environment. This image 710 is shown in FIG. 7B. The system performs image processing to identify the locations of UWB location devices. Object rectangles are drawn around the UWB location devices that are recognized. The object box 707 refers to UWB location device 702, and the object box 706 refers to UWB location device 705. UWB location device 704 is not recognized in the image because obstacle 703 is visually blocking it. Based on recognition, the object boxes 707 and 706 have assigned pixel locations within the captured image.

Figure 7C:
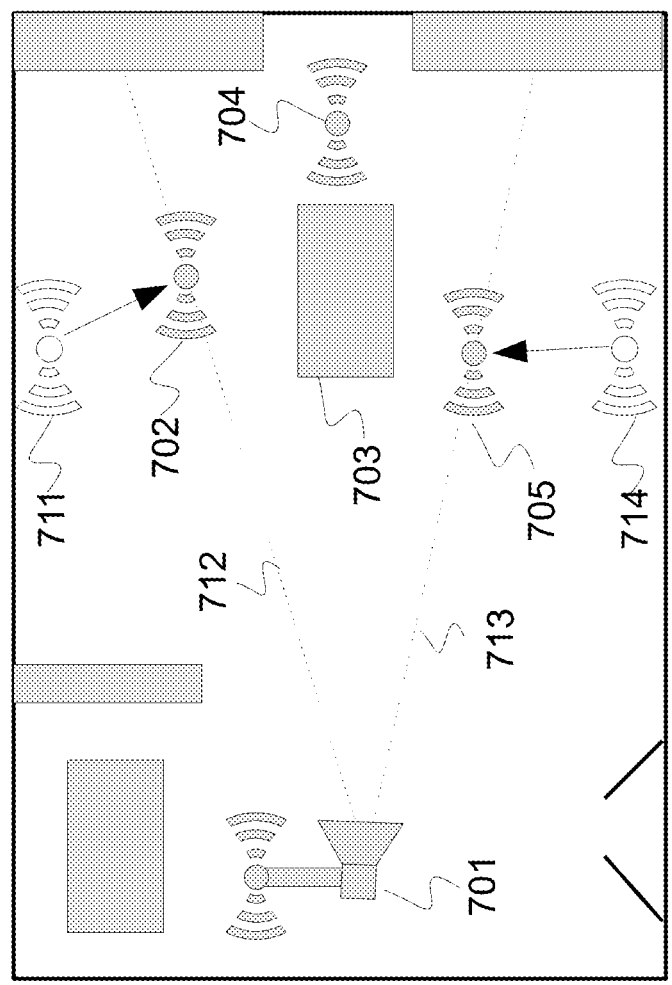
FIG. 7C is a diagram of the top-down view of an environment illustrating the location of devices in accordance with some embodiments of the present inventive concept.

FIG. 7C shows the environment that the network is operating in from a top-down perspective. UWB/Camera location device 701 is shown with two vectors 712 and 713 pointing radially from the camera. These two vectors correlate to the pixel locations in FIG. 7B of the object rectangles 707 and 706. The two vectors can assist in determining the location of the UWB location devices. The system originally had the location of the UWB location devices in error at locations 711 and 714. Since the camera image 710 had identified the locations as having to be along the vectors identified by 712 and 713, the system moves the location of the UWB location devices 702 and 705 onto the vectors so that their locations would better match the results from obstacle detection from the camera image 710. Note that UWB location device 704 could not be realigned yet since the obstacle 703 blocked the camera device's 701 view of the device. However, further refinement could be done for the location of UWB device 704 based on communications between it and UWB devices 702 and 705 and their new locations.

Camera sensors on location devices can also be used to detect obstacles impeding UWB transmission and reception performance. UWB typically works best when there are no obstacles directly in the vicinity of a UWB antenna. Oftentimes, line of sight (LOS) communication from the UWB antenna to the tracked objects yields better results and more accurate tracking. LOS refers to the ability for an RF system to send an RF signal from one device to another in a straight line without any blocking obstacles that may cause the signal to reflect and bounce, affecting the total length of travel as the signal goes from one device to another. Though this knowledge may be well known with the manufacturers of UWB equipment, installers of UWB systems within a facility may be less aware of these effects. In some cases, UWB location devices are installed in awkward locations within a few inches of the obstacles. A UWB/camera location device may help in diagnosing poorly placed location devices. With the use of a camera sensor, the system or troubleshooter may be able to determine that an obstacle in the immediate view of the system is degrading the RF performance of the system. An alert can be made to the installer who then can either remove the obstacle or move the location device to a more RF friendly location.

As illustrated by FIGS. 7A through 7C, a UWB/camera location device with views of other UWB location devices ensures that the UWB communication will be LOS. As part of a diagnostic in a system setup, maintaining a list of LOS location devices can help in evaluating the overall health of the system.

Figure 8:
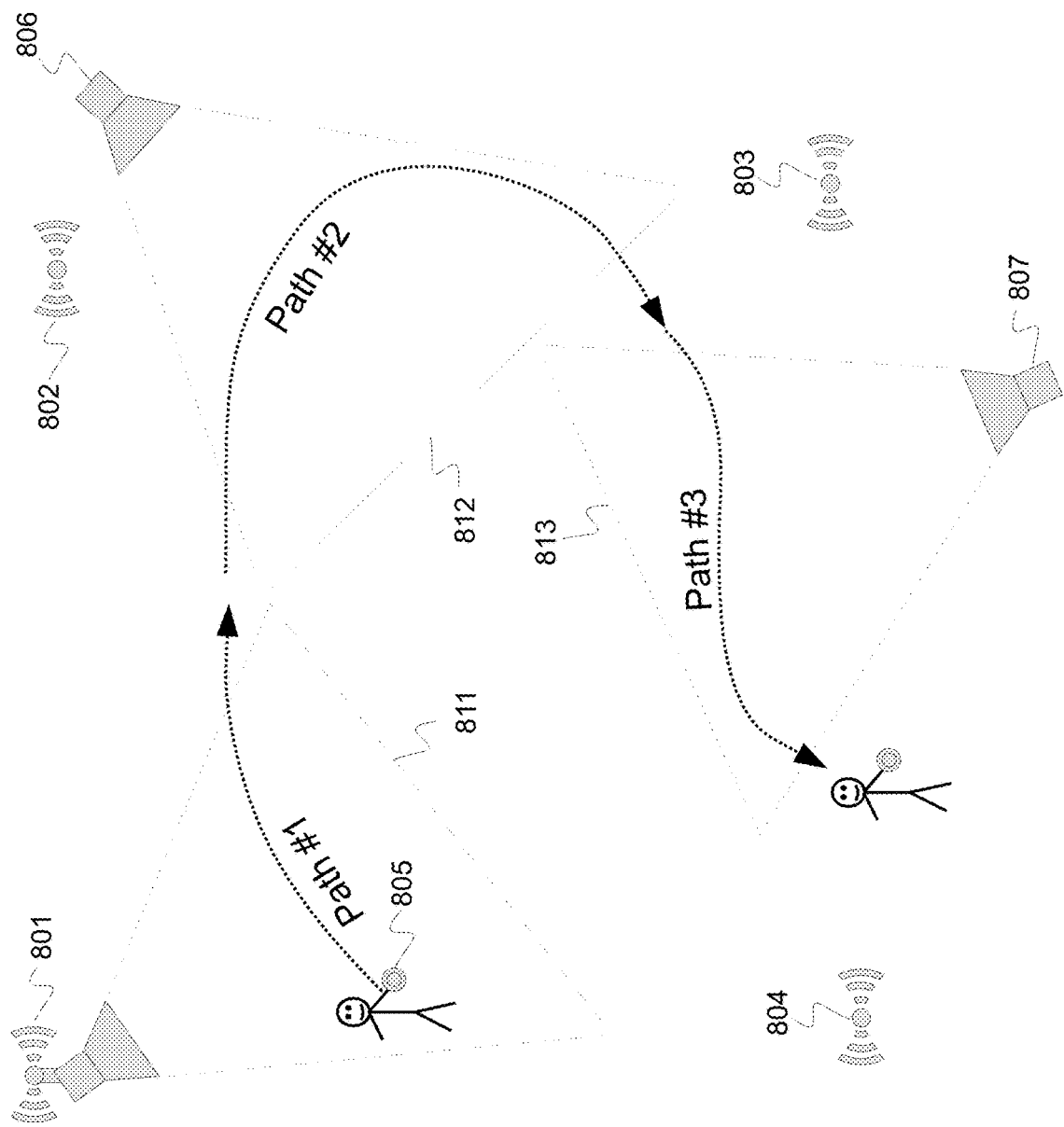
FIG. 8 is a diagram of a tagged item traversing an environment within a UWB/camera Real time location systems (RTLS) network in accordance with some embodiments of the present inventive concept.

Referring now to FIG. 8, methods for tracking a tag visually throughout a facility will now be discussed. Even without the ability to perform obstacle detection and classification, a combined camera/UWB location system can also aid in recalling visual information as illustrated in FIG. 8. Here a person associated with UWB tag 805 walks a loop around a facility. This loop can be broken up into three paths: Path #1, Path #2, and Path #3. For each path, the person is within the view of a different camera device, 801, 806, and 807, respectively. A UWB RTLS network is in operation with UWB or UWB/camera location devices 801, 802, 803 and 804. With the UWB tag 805, the system monitors and records the location of the tag as the person traverses all the paths #1 thru #3. At the same time, the camera devices in 801, 806 and 807 record video during the same period.

In some applications there may be a need to view the video footage of an object or person over time. When there is only one camera device and the tracked item stays within the camera sensor's view the whole time, this is a relatively trivial task. When there are multiple cameras and a tracked item may appear within the view of different camera sensors at different times, the challenge becomes much greater. Current solutions either rely on manual labor of someone reviewing video footage, or more sophisticated solutions may use an automated solution to recognize the object of interest within the video. Even with using these two methods, there may be no guarantee that the tracked item could be easily recognized, and in the case of hundreds of cameras, it simply may not be economical or feasible to perform timely manual review or computer vision object recognition processes on that much video footage.

In embodiments of the inventive concept illustrated in FIG. 8, the UWB RTLS solution tracks the UWB tags and associates the tags' location with the field of view of the camera sensor when available. In FIG. 8, the dashed triangles 811, 812, and 813 describe the viewing area of the three camera-based location devices 801, 806, and 807. The system calculates the location of the UWB tag 805 and associates the location with one of these three viewing areas (when available). Given the path trajectory, it is readily ascertained that the tag location is associated with camera device 801 for Path #1, with camera device 806 for Path #2, and camera device 807 for Path #3.

In some embodiments, the system laid out in FIG. 8 could also be used to determine blind spots for a camera system. UWB tag 805 is moved throughout the space and the visual attributes of the person object that are associated with it are automatically recorded as discussed above. At the end of Path #1, beginning of Path #2 and at the end of Path #2, beginning of Path #3 the system would be able to determine that no camera sensor can see an entity that resembles the human object carrying UWB tag 805. These locations could be recorded by the system. If the tag was moved throughout the facility in a systematic way the system could mark the locations when none of the camera sensors could view the human object. Using this method, a map can be generated that identifies the locations of the camera system blind spots. Even when a person object does not traverse a specific area, methods can be applied to determine if that area is within the blind spot of the camera sensors. For example, the area could be considered a grid of points where each point is visible to the camera sensors or is a blind spot. If a grid point is surrounded by blind spots, then the system can also assign that grid point as a blind spot. Likewise, if a grid point is surrounded by points visible to the camera sensors, then it too can be assigned as visible. More broadly generalizing, if a group of points is sandwiched between points with known visibility, then they can be assigned to the same state. When there is a need to view a tracked item (either real-time or during playback), the system can retrieve the video footage of the needed camera based on the UWB tag location data and the timestamp range of the tag data.

Figure 9:
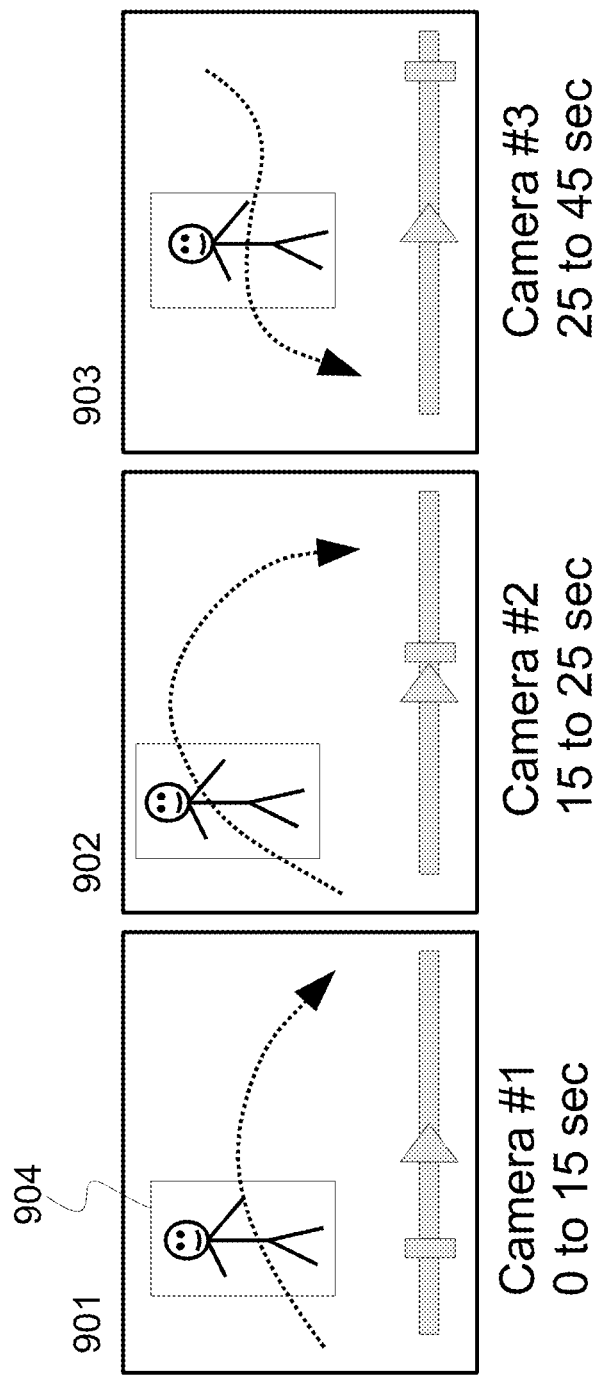
FIG. 9 is a diagram illustrating a composition of a series of video segments of a tracked item as it traverses the field of view of different cameras in accordance with some embodiments of the present inventive concept.

Referring now to FIG. 9, an example of a video playback of the tagged data example from FIG. 8 will be discussed. As illustrated, the video footage of Path #1 is shown from the camera device 801 in the video segment 901. Likewise, video footage of Path #2 is shown from the camera device 806 in the video segment 902, and similarly Path #3 is associated with video segment 902. As the video plays, the different camera viewpoints will be retrieved that continue to show the person with the UWB tag 805 being tracked. The system could further place a rectangle around the tagged person to specifically highlight the tagged person. Object recognition could be used to place a rectangle in the video feed, but alternatively, the location of the tag could be projected and highlighted onto the video without having to perform object recognition as well.

Though this example shows a single person being tracked with three camera sensors, the methods can be used for any arbitrary number of camera sensors and tracked objects. In some embodiments, a camera/UWB RTLS network may be set up in a sports arena for a broadcast, recorded or streamed sporting event. Players, participants, referees, or anyone else involved in the event have one or more tags attached to them, and a plurality of cameras are situated throughout the arena. Equipment used for the particular sport may be affixed with tags as well. Traditionally, following any individual sports player is manually intensive, but with the method described here, a player's real-time location could be associated with various cameras' points of view, and a sequence of video segments of the player could be compiled together. Additionally, the player could be highlighted with a circumscribing rectangle to highlight which player was being identified. If the cameras being used to record the event are sufficiently high resolution, traditional human-operated camera gimbals could be replaced with a combination of digital zooming, panning, and tracking. Alternatively, algorithms could be used to automate the movement of electromechanical camera gimbals and zoom lenses such that the UWB-tracked device remains centered in the cameras view and the player maintains a consistent size in the frame.

As discussed above, methods for overlaying a rectangle over an item in a video feed may highlight the particular item being tracked. However, other methods to highlight the item are also possible. Depending on the sophistication of the computer vision obstacle recognition, the contours of the tracked object could be highlighted. An arrow pointing to the item could also be used as well. The tracked item could be highlighted with a specific color. There are numerous ways to highlight a tracked item and the scope of the inventive concept does not limit it to any single solution.

In some embodiments of the present inventive concept, the system associates a visual object with its UWB tag without having to know the explicit location of the tag nor needing to have a UWB RTLS network set up. In these embodiments, the UWB location devices act semi-independently from one another. This may reduce the requirement for accurate localization and may increase overall reliability of matching UWB tags to their visual representations. To obtain accurate matching, the USB/camera solution tries to narrow down the searchable area within a camera sensor's image to the point where only a single object can be recognized visually. At that point, the visually identified object can be accurately paired with the UWB tag.

Figure 10A:
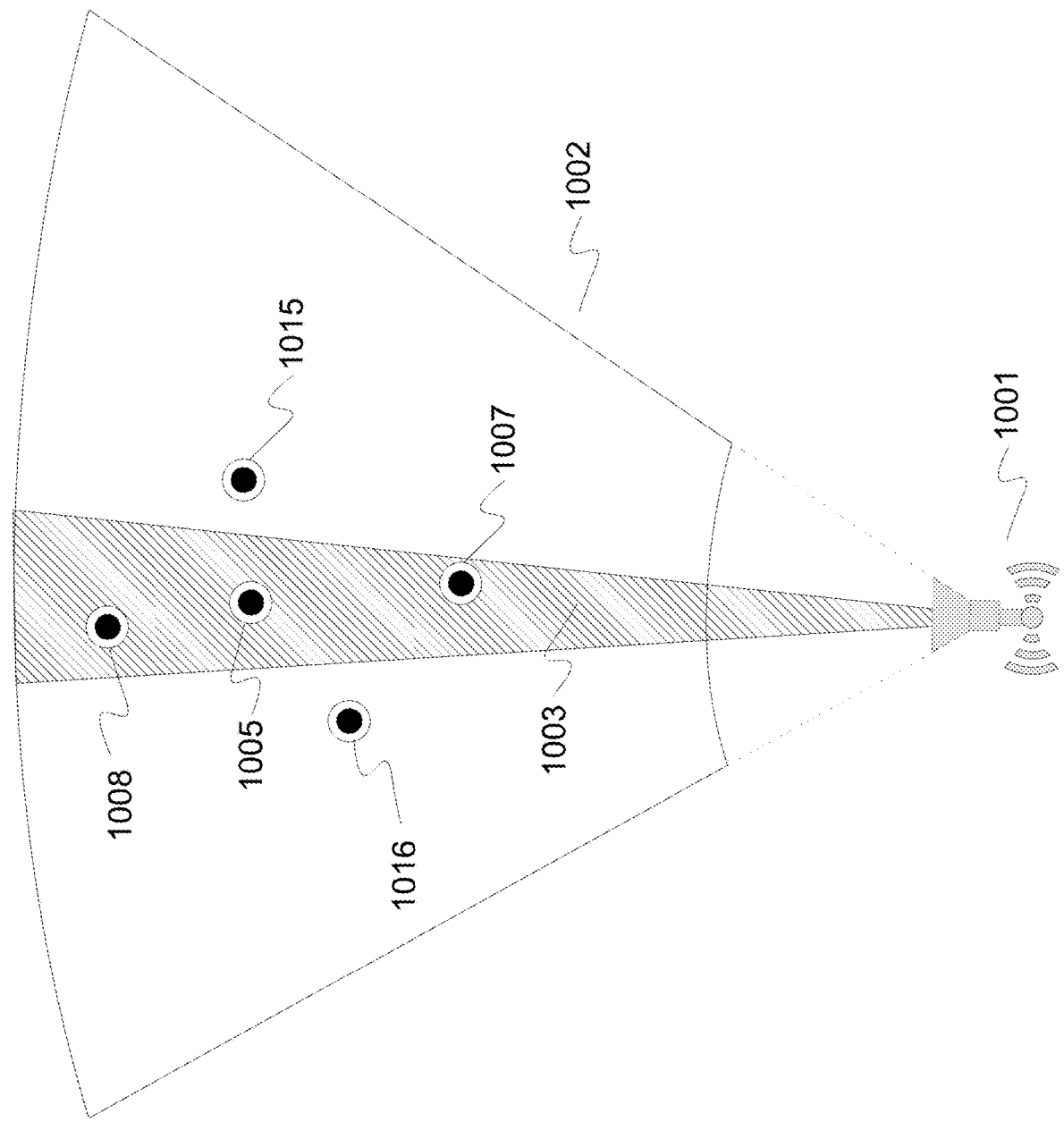
FIG. 10A is a diagram of a UWB/camera location device identifying specific tags through Angle of Arrival (AoA) measurements in accordance with some embodiments of the present inventive concept.
Figure 10B:
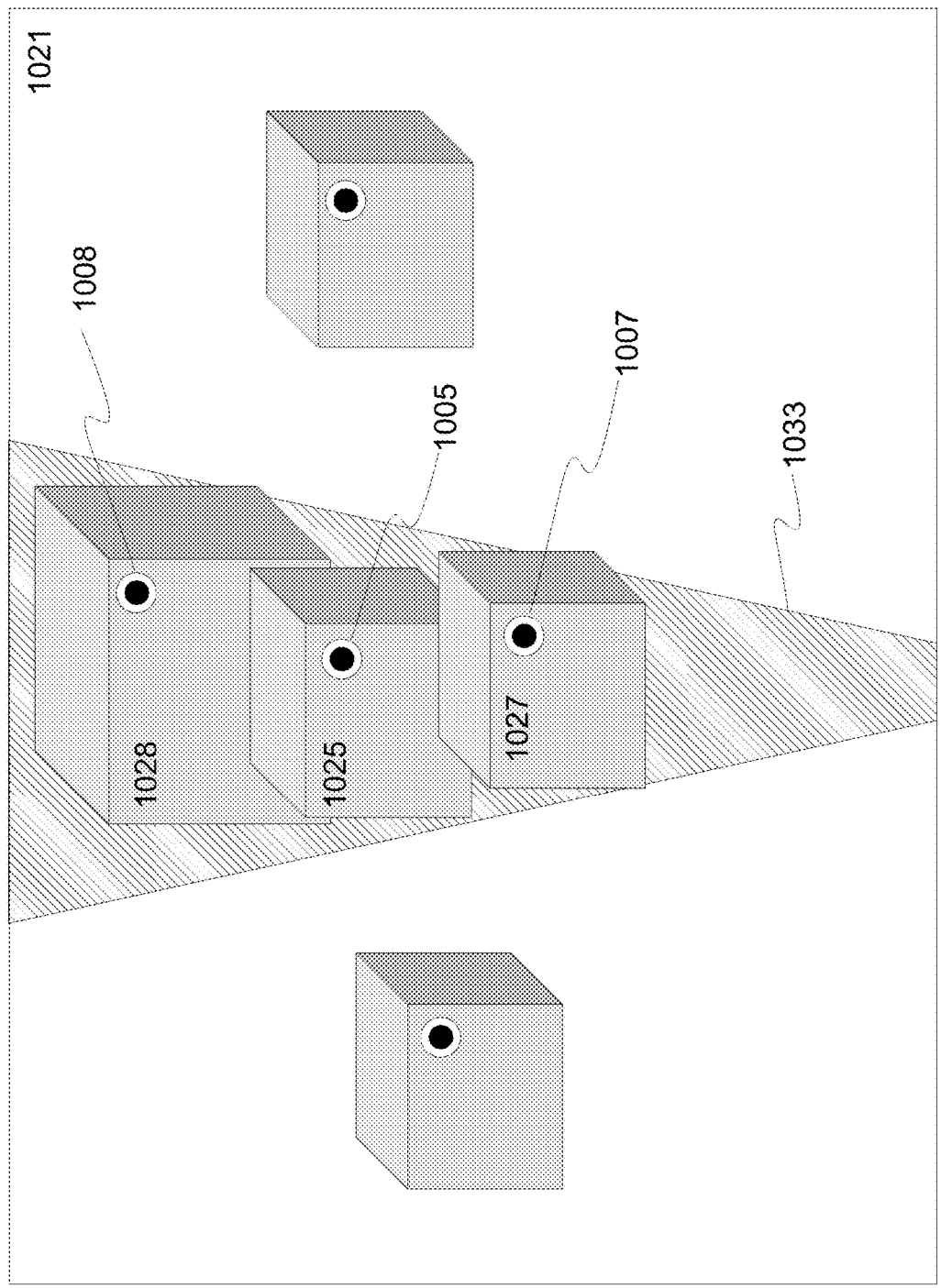
FIG. 10B is a diagram of the camera's field of view illustrating objects within a searchable area in accordance with some embodiments of the present inventive concept.

Referring now to FIGS. 10A and 10B, a standalone UWB/camera location device operating independently will be discussed. The camera sensor and UWB unit are calibrated such that measurements from the UWB unit can be mapped to the camera sensor's field of view. The UWB unit is capable of performing one or more UWB measurements types, such as AoA, ToF, and/or timestamp measurements, to isolate a UWB tag from other UWB tags. In FIG. 10A, using AoA measurements from the UWB system, it is noted that tags 1008, 1005, and 1007 all fall within roughly the same AoA area 1003 as denoted with the hash marks. The level of accuracy of the AoA measurement determines how narrow the band of the AoA area 1003 is. Since the UWB unit is almost coincident with the camera sensor, the system can reduce the searchable area of the camera's image to just that area that correlates with the AoA measurements. If there were just one tag present within the searchable area of the image, then the system could accurately pair a tag with the associated object within the camera's field of view. However, the objects associated with tags 1008, 1005, and 1007 will all be present within the searchable image. Since there is more than one object within the AoA area 1003, the system cannot yet accurately associate a tag to a visual object itself.

This can be illustrated as a captured image of the environment in FIG. 10B. The captured image 1021 shows the objects ("boxes") that are tagged. Box 1025 is tagged with UWB tag 1005, for example. The searchable area is highlighted as 1033 and is represented as the projected area from the AoA area 1003 in FIG. 10A. The system may apply object recognition and classification algorithms to identify the three boxes, 1028, 1025, and 1027 within the searchable area. However, without more information, the system may not be able to decipher which one is which.

Figure 10C:
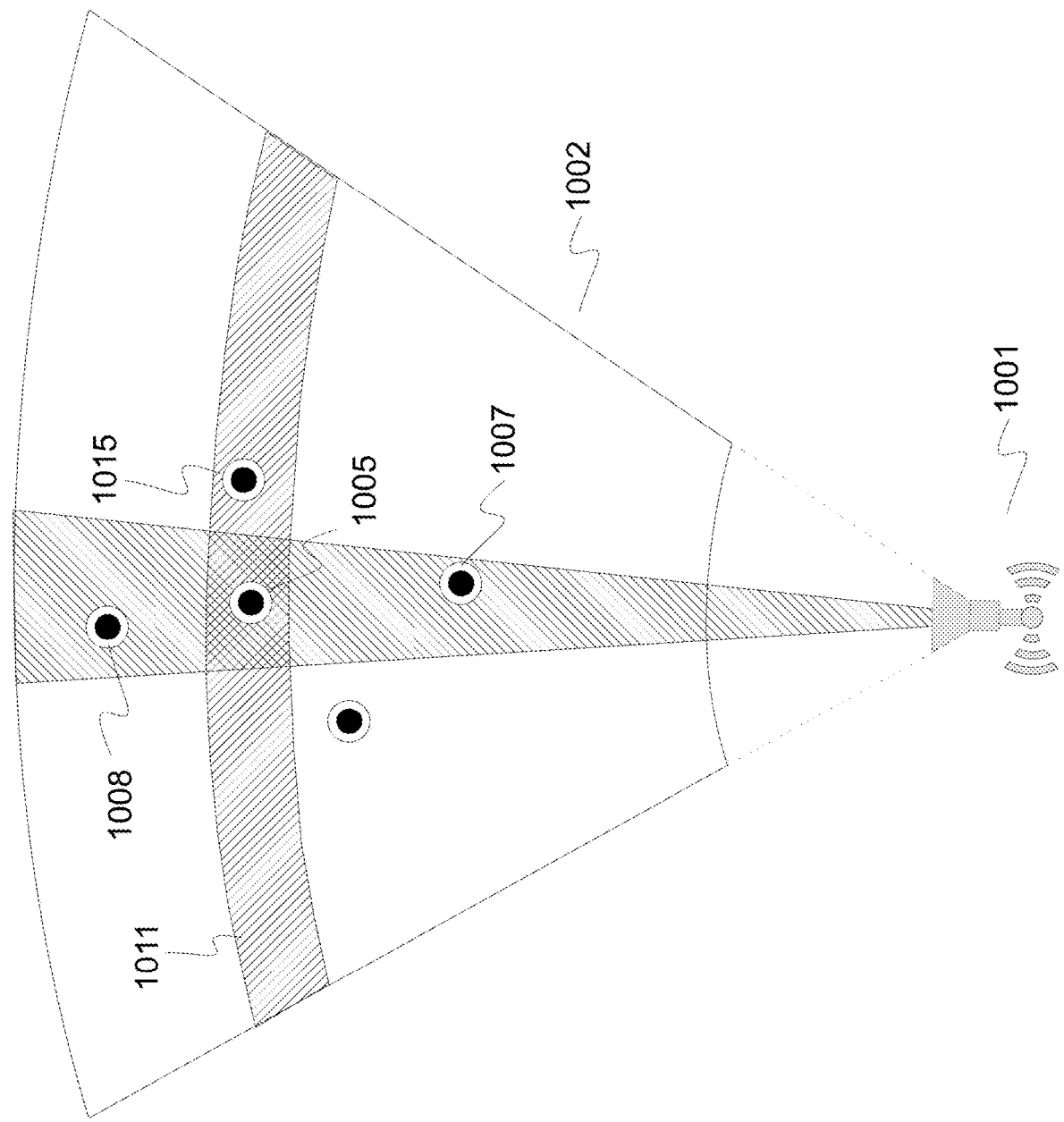
FIG. 10C is a diagram of a UWB/camera location device identifying specific tags through distance and AoA measurements in accordance with some embodiments of the present inventive concept.

The system can further refine the search criteria with the addition of another UWB sensor measurement. As illustrated in embodiments of FIG. 10C, the system performs a ToF measurement from location device 1001 to each of the UWB tags. The distance reading is shown visually as the narrow band 1011 containing tags 1005 and 1015. The original AoA measurements reduced the search area 1033, but still included 1008, 1005, and 1007. However, with the inclusion of the ToF measurement, the correct UWB tag is determined to be at a distance from location device 1001 that is shorter than UWB tag 1007, but longer than UWB tag 1008 which leaves UWB tag 1005 as the correct device.

In FIG. 10B, the camera search area 1033 may not have been reduced, but with the additional information, the camera can accurately associate the tag with an object. Two additional methods will be discussed herein. In a first method, the system applies vision processing to recognize objects within the searchable area of the camera image as illustrated in FIG. 10B. As noted, three boxes 1028, 1025, and 1027 are identified. If the boxes are somehow overlapping or if the size of the box in the image correlates with the distance it is away from the camera, a determination can be made as to which boxes are nearer to the camera and which ones are farther. In these embodiments, the UWB tag 1005 was determined to be between UWB tag 1007 and UWB tag 1008 based on the ToF measurements. Within the captured image 1021 of FIG. 10B, the system can correctly identify the middle box 1025 and therefore have an association with UWB tag 1005. In some embodiments, the camera sensor is a stereo vision camera system or a scanning LiDAR unit capable of measuring depth. In these embodiments, the depth equates to a distance measured from the camera sensor. Matching the depth camera distance with the distance of the ToF measurement allows the removal of all but one of the boxes as viable candidates for accurate paring of a UWB tag with the associated object from the captured image.

Figure 11:
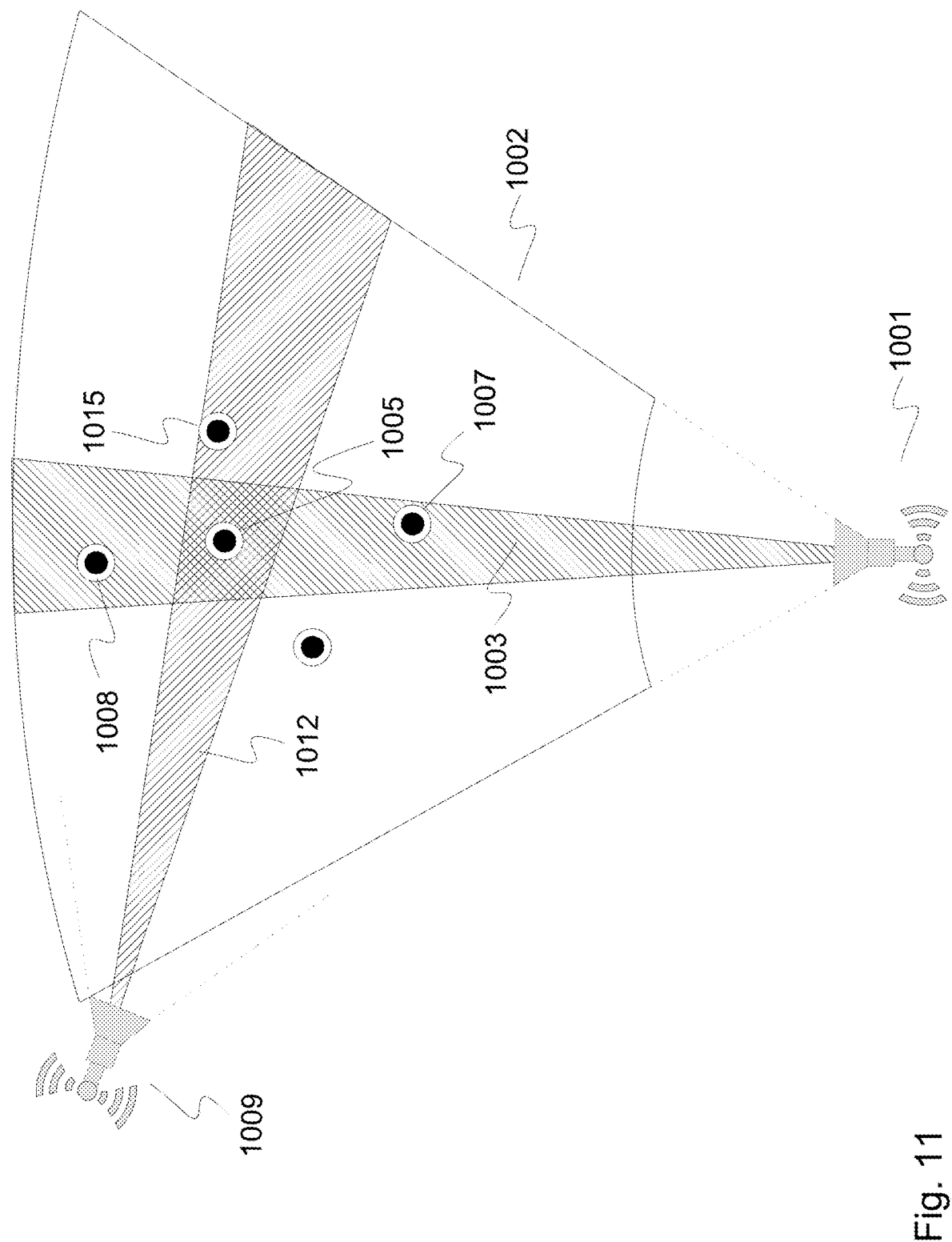
FIG. 11 is a diagram of two UWB/camera location devices identifying specific tags within their field of view in accordance with some embodiments of the present inventive concept.

Referring now to FIG. 11, a different arrangement with two UWB/camera location devices, 1001 and 1009 will be discussed. As in FIG. 10A, the system initially performs an AoA measurement between the tags and the individual UWB units. For location device 1001, the AoA measurement carves out a searchable region 1003. There are three tags 1008, 1005, and 1007 within the region 1003. Likewise, for location device 1009, the AoA measurement carves out a searchable region 1012. Within region 1012, there are two tags: 1015 and 1005. The two regions from each of the camera devices 1001 and 1009 have UWB tag 1005 in common. The cameras devices 1001 and 1009 each capture an image. The searchable regions are translated to searchable areas within the images of the two cameras. Each captured image has multiple objects within their searchable area. Within the searchable areas of both images is the same object which is associated with UWB tag 1005. The captured image of location device 1001 is the same as in FIG. 10B and shows objects 1028, 1025, and 1027 within the searchable area 1033. The captured image of location device 1009 (not shown) contains objects associated with the UWB tags 1005 and 1015. Note that UWB tag 1005 is the only tag whose object appears in the searchable areas of both captured images. Therefore, the vision system can then apply a computer vision object identification algorithm that recognizes the same object within both images in order to eliminate other objects as candidates for pairing. In these embodiments, the object 1025 in FIG. 10B is identified in the searchable areas of both captured images and therefore is accurately associated with UWB tag 1005. Once this object has been positively identified it can be associated with whatever identity is transmitted by the tag, for instance a MAC address, as well as whatever metadata might be available for that tag. From this point on traditional image processing and object recognition techniques can be used to track the tagged object through the space and across different cameras.

Figure 12:
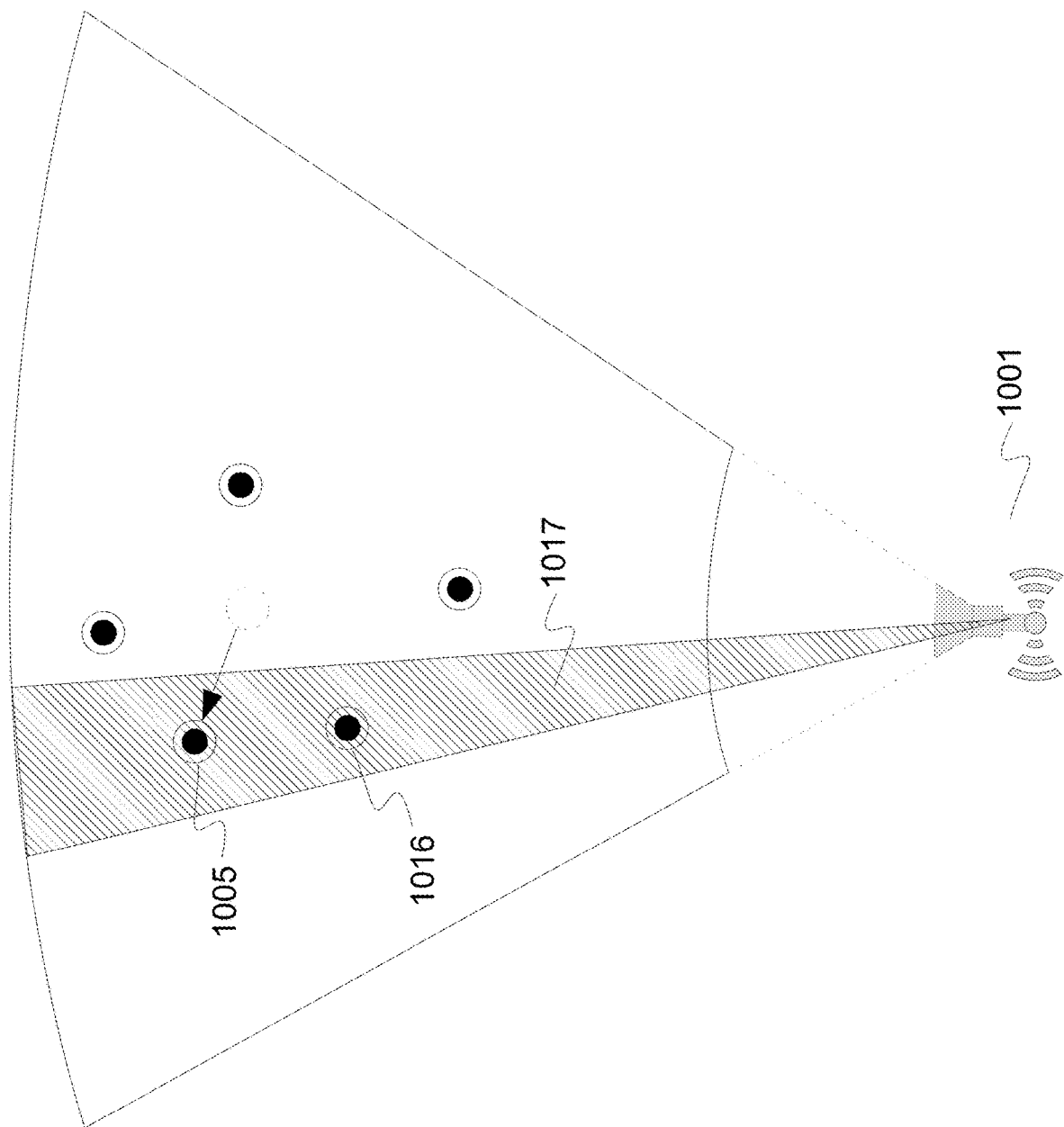
FIG. 12 is a diagram of a UWB/camera location device identifying specific tags from temporally separated AoA measurements in accordance with some embodiments of the present inventive concept.

Similar in method to FIG. 11, FIG. 12 illustrates how this method can be applied temporally as well. Again, the tags are arranged similarly to FIG. 10A, and again an AoA measurement captures UWB tags (1008, 1005, and 1007) within the searchable region 1003, and an image 1021 is captured as in the case of FIG. 10B. After some amount of time has passed, UWB tag 1005 has moved as shown in FIG. 12. A new round of AoA measurements are taken, and the UWB tag 1005 has a new AoA search region 1017. This time, the search region 1017 contains two UWB tags, 1005 and 1006. Lastly, an image is captured, and the system identifies a new search area within the image (not shown). Now, there are two captured images, but instead of the captured images being from two different camera sensors at the same point in time, the captured images are from the same camera sensor from two different points in time. In the first captured image, the searchable area included UWB tags 1005, 1007 and 1008. In the second captured image, the searchable area included UWB tags 1005 and 1016. Since there is only one object associated with UWB tags 1005 in both search areas of the captured images, then the vision system can then apply a computer vision object identification algorithm that recognizes the same object within both images in order to eliminate other objects as candidates for pairing.

This method of using two captured images to associate an object for a given UWB tag is not restricted to the above examples. For scenarios with many objects crowded together, it may take multiple captured images from both different cameras and at different times to sufficiently discriminate the objects that tags are associated with. An example of this would be a large crowd in a mall, or a conference or convention center type event. In these environments, it may be impossible to have any single camera view having a single object to identify. Perhaps 10 or 30 people may be within the searchable area at any one time. However, over time and from one camera view to the next, the chance that a tagged object can be uniquely identified through correlated images increases dramatically.

Figure 13A:
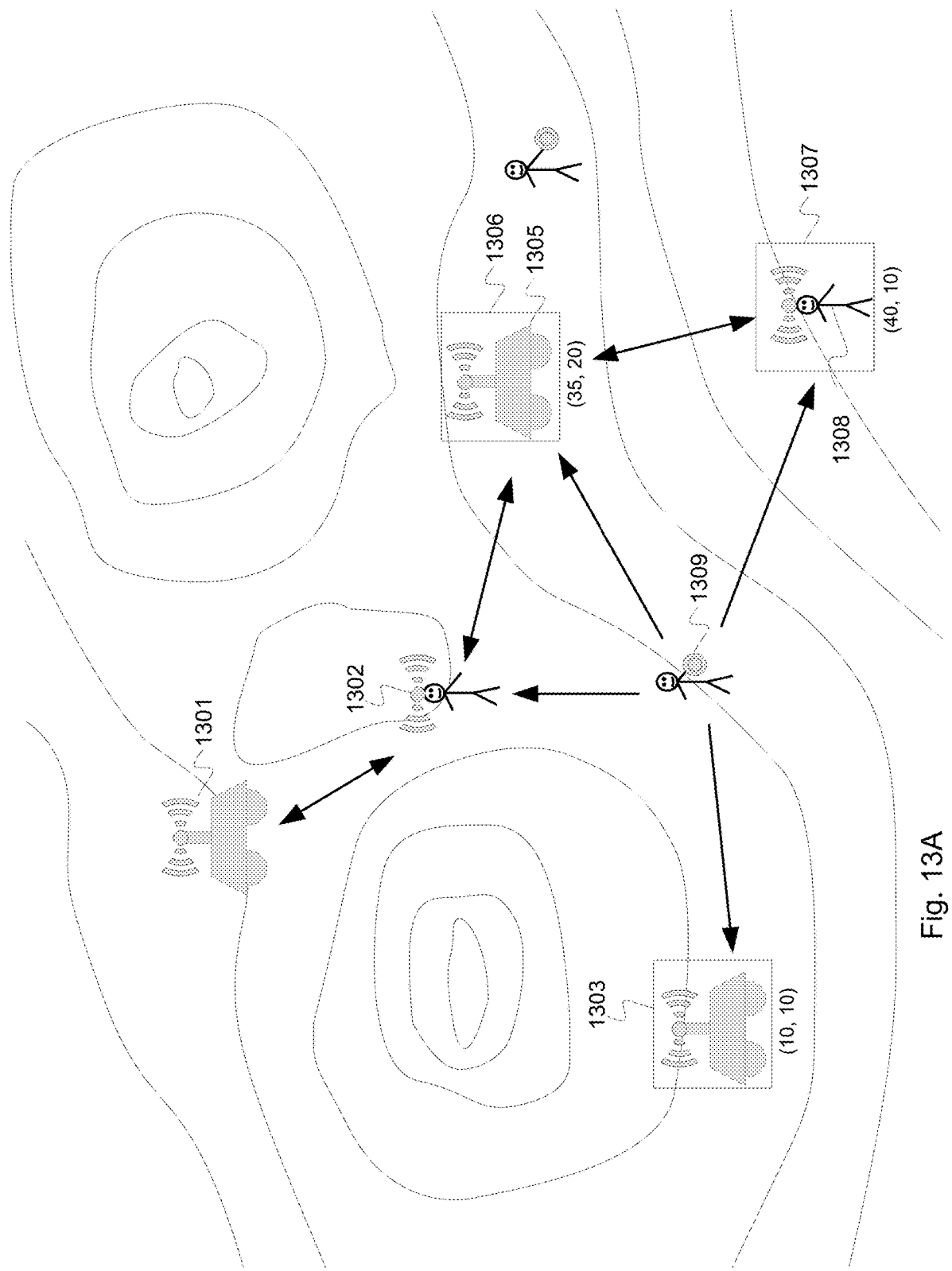
FIG. 13A is a diagram of a topographical map where mobile and tagged items are identified in accordance with some embodiments of the present inventive concept.

Camera/UWB based RTLS solutions applied to field operations using ground vehicles and flying drones will now be discussed. FIG. 13A illustrates a topographical map of people and vehicles on varying terrain. On the ground, the UWB-based system communicates with both tags 1309 and location devices (1305, 1301, 1302, 1308) to form a mobile UWB RTLS network, monitoring and updating locations of all devices. U.S. Provisional Patent Application Ser. No. 62/965,361 entitled, Mobile Antenna Device for Multiple Tag Tracking discusses mobile UWB networks in more detail, the contents of which is hereby incorporated herein by reference as if set forth in its entirety. Not shown in FIG. 13A is a drone flying above with a camera location device overlooking the people and vehicles. As the drone flies over, its camera location device recognizes various objects and identifies their pixel location on an image as pointed out by object rectangles 1303, 1306, and 1307. However, devices 1301, 1302, and tag 1309 are not recognized by the drone-based camera device. With knowledge of the global positioning system (GPS) coordinates of the drone in physical space, these pixel locations are mapped into coordinates on the ground and used to determine the locations of the remaining devices and tags as part of the location determination.

Figure 13B:
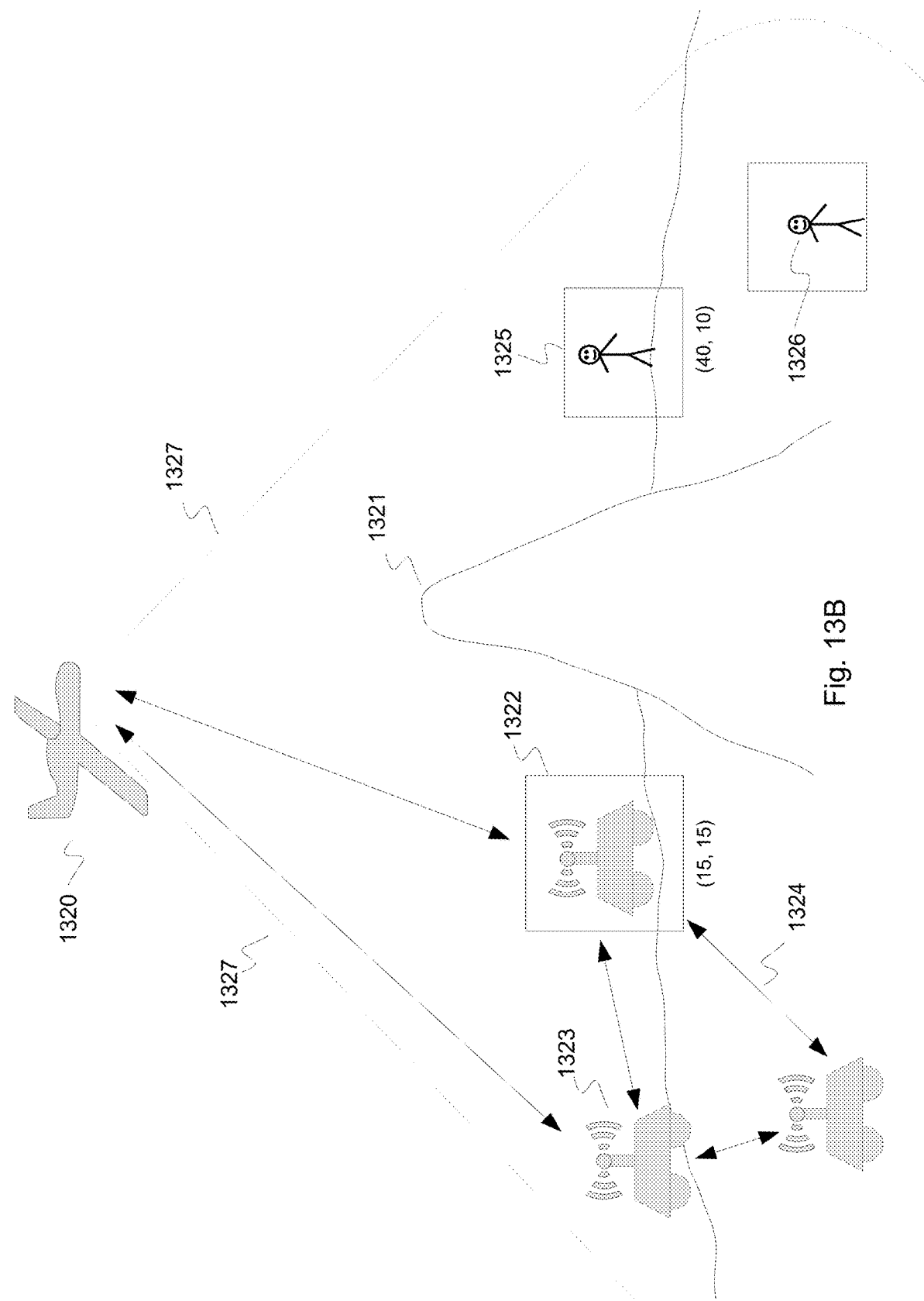
FIG. 13B is a diagram of a terrain map with a drone flying above as part of a UWB/camera RTLS network used for both people and vehicle objects on the ground in accordance with some embodiments of the present inventive concept.

FIG. 13B illustrates a modified embodiment of the above scenario. The drone 1320 includes both a UWB and camera location device. The camera sensor is pointing down towards the ground with a viewable area within the dashed lines 1327. Both people and vehicles objects are recognized by the drone's camera location device and are demarcated by boxes 1325 and 1322 in the Figure. Some objects 1323 will contain UWB devices, while other objects 1326 will not. One of the applications of this scenario is to get location information from the objects that do not have UWB tags or location devices. In these embodiments, the people objects 1326 do not have UWB tags and are not visible by the ground vehicles 1323 because of the hill 1321 blocking the view. It may be necessary for the vehicle objects 1323 to know the location of the people objects 1326. In these embodiments, the drone 1320 and vehicle objects 1323 form a UWB/camera RTLS network. UWB devices facilitate the location determination by sending and receiving UWB RF signals 1324. Using both UWB and camera sensor data, the RTLS system can determine the relative location of one another. By extension, the drone can identify the location of the people objects 1325 and inform the necessary vehicle objects within the network of their relative location. Note that even in GPS denied areas where GPS and global position information is not readily available, the relative locations of objects can still be determined using the UWB/camera RTLS solution. Applications using this method include search and rescue in addition to military related target identification.

The following section discusses embodiments of the present inventive concept where the location devices can interconnect to allow for shared power and/or data transfer. A system for providing power and data to multiple UWB location devices is described in United States Patent Application Serial No. 2018/0241130A1, entitled Systems and Related Adapters for Providing Power to Devices in a System, the disclosure of which is hereby incorporated herein by reference as if set forth in its entirety. In these embodiments of the present inventive concept, camera-based location devices can also be interconnected to access power/data.

Figure 14:
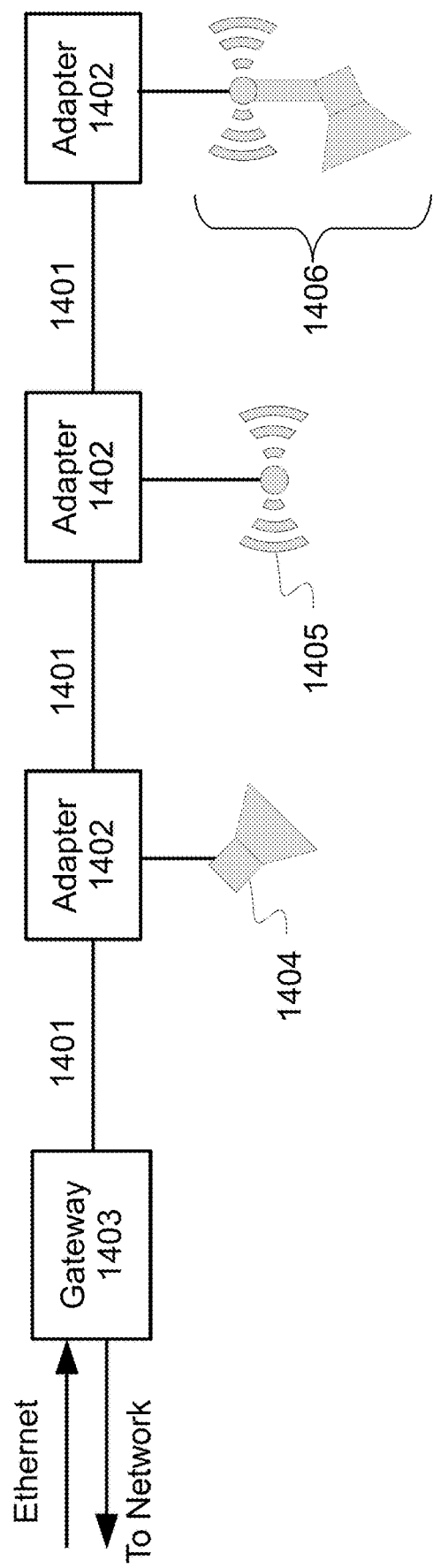
FIG. 14 is diagram illustrating the connectivity of location devices to adapters and gateways in accordance with some embodiments of the present inventive concept.

Referring now to FIG. 14, as illustrated a gateway device 1403 is connected to a network either through WiFi or ethernet. It could be powered through a wall plug to an AC outlet. Alternatively, it could be powered through PoE. The gateway 1403 connects to adapter devices 1402 through cabling 1401. The cabling contains multiple conducting wires. In some embodiments the cable could be an ethernet cable. The cable transfers both power and data. Power is sourced from the gateway 1403 and travels down the cabling line 1401 to all the adapters 1402. Data is bidirectional and allows adapters and gateways to directly communicate with one another. Adapters, in turn, have additional plugs in which location devices can be connected. A camera location device 1404 is plugged into one adapter 1402, and UWB and UWB/camera devices 1405 and 1406 are plugged into the two other adapters.

In some embodiments, adapters can be combined with the camera location device into a single composite device. The features of both devices are contained within the composite device, capturing image data from the camera sensor and allowing communication and power to upstream and downstream adapter devices.

Data rates/power may be limited, so camera location devices may be limited in how fast they can capture image data and transmit data back through the gateway. Data compression methods either on the adapter or camera location device can reduce the bandwidth requirements of the system. Alternatively, the vision processing of objects could exist on the camera location device, and then, only the results are sent through the adapter. Still Furthermore, the image capture rate could be controlled farther upstream either at the adapter, gateway, or still beyond the gateway such that if the bandwidth is too high, the system requests less frequent image updates.

In some embodiments, one of the gateways uses a PoE/PoE+ protocol to communicate to and receive power from the external network to the gateway 1403. PoE specifies input power up to 13 W and PoE+ allows for input power up 25 W. Newer PoE specifications can allow up to 71 Watts. For PoE specified data rates, newer specifications can allow up to 10GBASE-T Ethernet. The cabling 1401 between gateway and adapters could be a private protocol but it could also be an ethernet-based protocol allowing for high data rates. In some embodiments, the cabling 1401 uses some variant of the PoE specification for both power and data. Consider the example where an individual camera sensor generates video with a data bandwidth upward of 100 Mpbs and consumes 4 W of power. With ten adapters each connected to a camera locating device daisy-chained together, the power and data rate requirements would increase at least tenfold. The ten camera location devices together would consume at least 4 W*10=40 W and have a bandwidth requirement of 10*100 Mpbs=1 Gbps. The cabling resistance from adapter to adapter would also contribute to the power loss as well. PoeE+ could nevertheless handle these power and throughput requirements. The advantages of this embodiment of the current inventive concept is the reduction of the total number of Ethernet ports and amount of wiring that needs to be installed by daisy chaining location devices together. This ultimately may reduce costs for the installation of the camera/UWB RTLS system without compromising power and data requirements.

The use of spatial probability distribution functions (PDF) using combined UWB and camera sensor data will now be discussed. This inventive concept is discussed in commonly assigned U.S. patent application Ser. No. 17/161,122, filed on Jan. 28, 2021 entitled Real Time Tracking Systems in Three Dimensions in Multi-story Structures and Related Methods and Computer Program Products, the contents of which is hereby incorporated herein as if set forth in its entirety. The reference describes the use of UWB sensor data to build a spatial probability map to determine location of a UWB tag. In these embodiments, obstacle recognition data from camera sensors is included in the calculation of the spatial PDF.

Figure 15A:
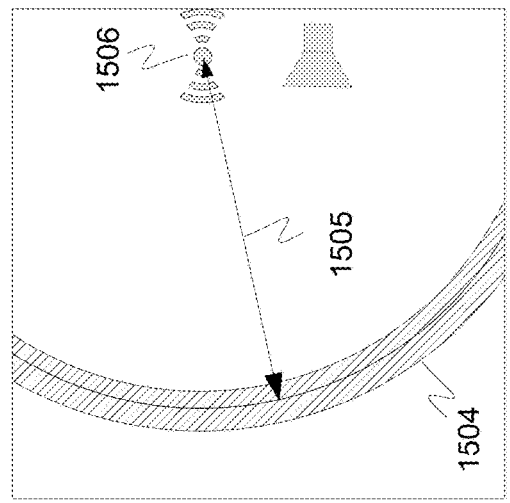
FIG. 15A is a diagram illustrating the spatial probability distribution functions (PDF) of an object recognized from a camera location device in accordance with some embodiments of the present inventive concept.

Referring now to FIGS. 15A through 15D, the use of both UWB and camera sensor data to build a spatial PDF will be discussed. As illustrated in FIG. 15A, a tagged object (not shown) is seen by a camera location device 1503. The camera device 1503 captures an image and performs computer vision object recognition to the image. The object recognition algorithm detects an object at a specific pixel location within the image. There may also be a confidence factor and pixel range uncertainty associated with the recognized object. The confidence factor indicates the probability that an object was in fact detected, and secondly, the pixel range uncertainty indicates the accuracy of the location of the detected object. Furthermore, most monocular camera sensors may not be able to accurately determine the depth at which an object was detected. Therefore, in addition to the confidence factor and pixel range uncertainty parameters, there may also be a depth range uncertainty associated with the location of the object as well. The system then transforms the object's pixel location and range uncertainties into spatial coordinates. In FIG. 15A, a detected object may show an area of high probability as indicated by 1501. For simplicity, the example shows a 2D spatial representation of the object, and one of the dimensions from the camera image is not represented. The view is top-down, whereas the camera is roughly facing in the direction from right to left. The long and narrow area of high probability 1501 shows that the range uncertainty of the pixel location is relatively narrow compared the range uncertainty of the depth. This is consistent with the monocular camera's inability to accurately calculate depth.

Figure 15B:
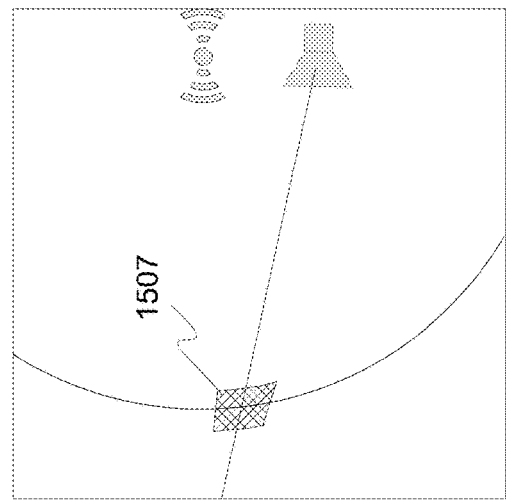
FIG. 15B is a diagram illustrating the spatial PDF of a UWB time of flight (ToF) measurement in accordance with some embodiments of the present inventive concept.
Figure 15C:
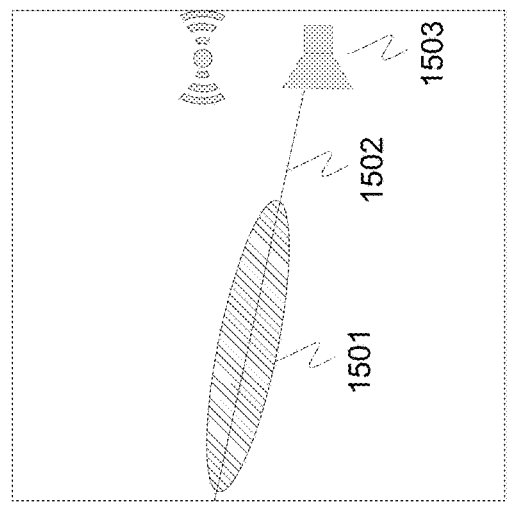
FIG. 15C is a diagram illustrating the individual and composite spatial PDFs from the camera and UWB location devices in accordance with some embodiments of the present inventive concept.
Figure 15D:
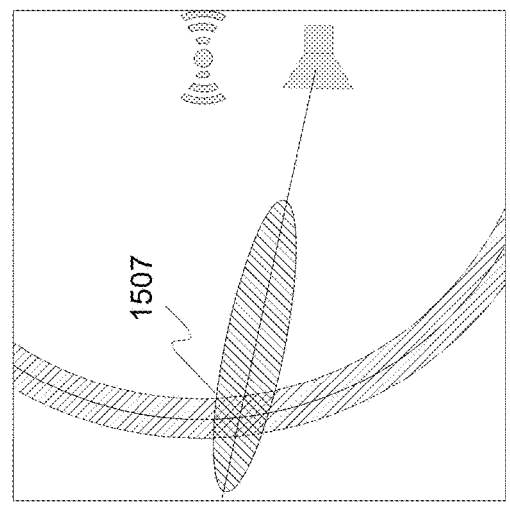
FIG. 15D is a diagram illustrating the composite spatial PDF of camera and UWB location devices in accordance with some embodiments of the present inventive concept.

In FIG. 15B, a UWB ToF measurement occurs between the tagged object (not shown) and the UWB location device 1506. The distance is represented by 1505 and the spatial PDF is the resulting circular band 1504. FIG. 15C shows the combined spatial PDFs of both the camera and UWB location devices, 1503 and 1506. Only the intersection 1507 of the two areas of high probability represent viable locations for the object. FIG. 15D is the same as FIG. 15C, showing only the composite area of high probability 1507 without the inclusion of the separate spatial PDFs from each of the camera and UWB location devices. As with combining spatial PDFs from UWB measurements, the composite PDF is the result of the product (multiplication) of the spatial PDFs from individual measurements at each and every point.

Though most monocular camera sensors may not be able to accurately determine the depth at which an object was detected, there are methods that can be used to estimate depth. If the size of the object in absolute terms is known, the size of the object within the captured image can be related to how far away the object is from the camera sensor. Alternatively, the system could use the knowledge of depth of other objects within the field of view to determine depth. For instance, if a theoretical Object A has a depth to the camera of 2 meters and partially occludes the recognized object, then one can deduce that the recognized object is behind Object A and therefore must be at least 2 meters away. Or if theoretical Object B (with depth of 5 meters) is occluded by the recognized object, then the system can determine that the recognized object is no more than 5 meters away.

As another method for determining depth, the focus of the camera sensor can be used. A camera sensor with a narrow depth of field and autofocus capability could be used to detect depth of view. When the object is in focus the focal distance of the camera can be measured and thus the distance to the object is known. Various methods exist for applying autofocus and the current inventive concept does not differentiate between them. For example, one simple method is comparing contrast between neighboring pixels. When the contrast is greatest the pixels are in focus. By focusing on a small subset of pixels in the area of interest, the system can determine if the object is in focus. Using a narrow depth of field, however, has some disadvantages. Namely, it may be more difficult to apply computer vision obstacle recognition methods to an image if sections of that image are out of focus and too blurry.

The dynamic pairing of a person with a UWB tag in a UWB/Camera RTLS network will now be discussed. In some scenarios, it is not necessary to intentionally tag a person at all. For example, in a workshop environment, the hardware tools are tagged with UWB tags and the person using the tools is not. The person is only temporarily paired with a UWB tag when they pick up a tool. Once the person puts down the tool, they are no longer paired with the tag. However, as the person picks up and uses tagged tools, the system can develop a history of the person's movement and location.

Figure 16:
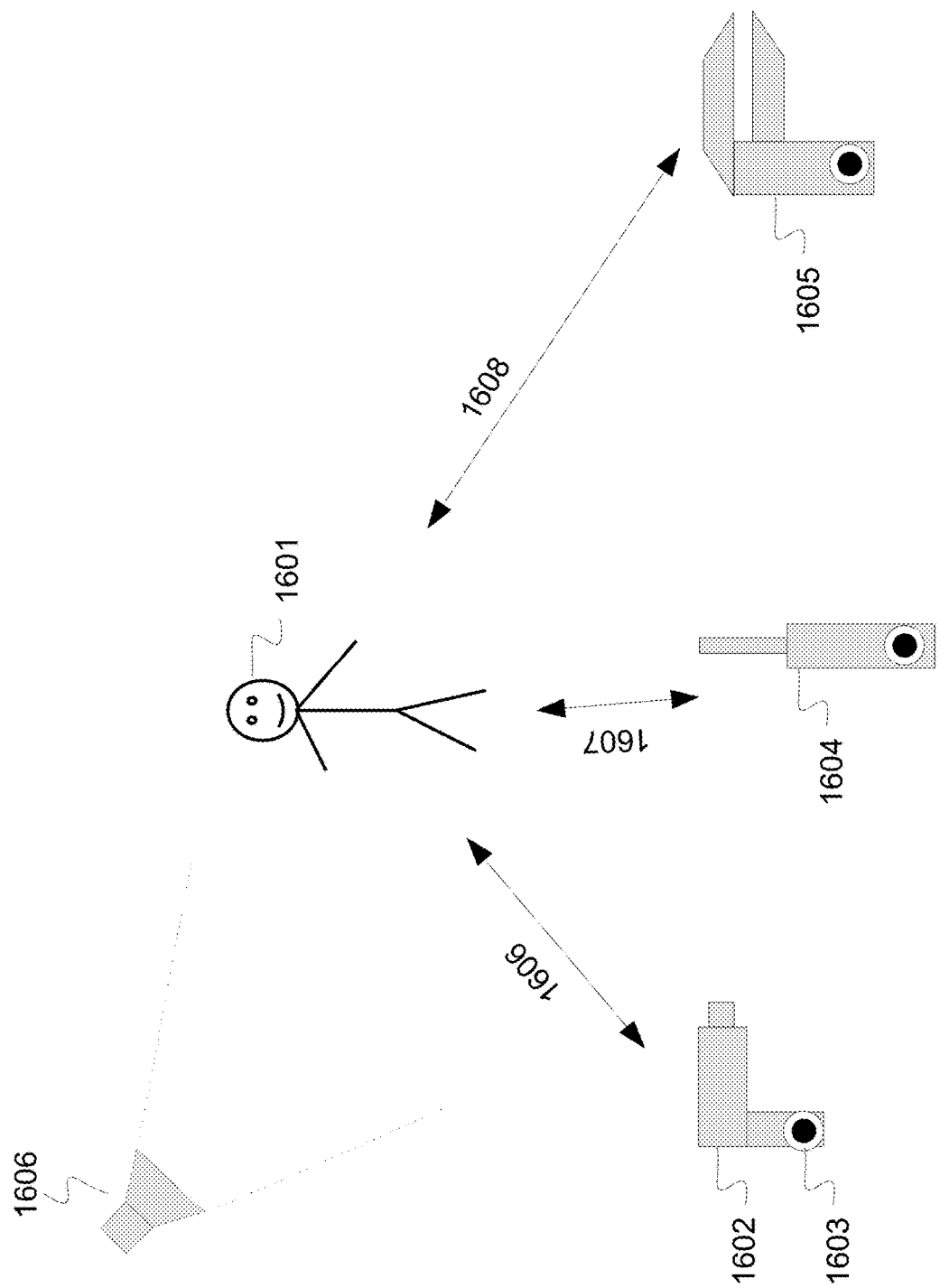
FIG. 16 is a diagram illustrating a user being tracked by their association with tagged tools in accordance with some embodiments of the present inventive concept.

Referring now to FIG. 16, the person 1601 is in a UWB/Camera RTLS network and uses the following tools: a hand drill 1602, a screwdriver 1604, and a vice grip 1605. The person 1601 is initially untagged. The system may already have information on the visible attributes of the person 1601. Alternatively, the system may not. This could be similar to a publicly accessible workshop where visitors to the workshop are not readily identified from day to day. As the person 1601 picks the hand drill, the camera location device 1606, pairs the UWB tag 1603 of the drill 1602 to the person 1601, extracting the visual attributes of the person. The visual attributes may be color, shape, size of the clothing or additional visual characteristics of that person such as facial parameters like beard, eyeglasses, long or short hair. While the person is using the tool, the system is able to track the person through the UWB/camera network. The person 1601 may put the drill 1602 down and grab another tool such as the screwdriver 1604. The screwdriver 1604 is tagged with a UWB tag, and again the system can associate the screwdriver 1604 with the person 1601 and extract the visual attributes of the person. The system does not immediately know which person it is, but upon comparison of the visual attributes with those extracted when the person 1601 held the screwdriver 1602, the system notes that the visual attributes are the same and determines that the same person 1601 used the screwdriver 1604 as the person who previously used the drill 1602. During the screwdriver's use 1604, the system can track the person 1601 through the screwdriver 1604's UWB tag. Once finished with the screwdriver, the person 1601 could again grab another tool, a vice grip 1605. Since the vice grip 1605 is tagged, the system, again, can grab visual attributes of the person and associate those with the same person who previously used both the screwdriver 1604 and the drill 1602. Even though the person 1601 was not permanently tagged, he held tools and objects that were tagged that enabled the system to build a history of that person throughout the facility as they used each of the tools.

In the situation illustrated in FIG. 16, the system grabbed the visual attributes of the person 1601 three times, one time for each use of the three tools. The system then made a match on those visual attributes to determine that same person used all three tools. In order to grab the visual attributes, the system used a camera location device positioned within view and correctly oriented such that a sufficient amount of visual information could be extracted from the person object in the captured images.

Such a system has advantages over a purely camera-only system without UWB capabilities. A camera-only system could possibly track the same person throughout a facility without the need of UWB location devices. However, such a system requires a different set of vision recognition capabilities. In embodiments illustrated in FIG. 16, the tools themselves do not need to be recognized by the camera system in order to associate the tool use with the person. Without UWB tracking capabilities, however, a camera-only based solution would need to apply object recognition not just to the person but to the tools as well in order to determine which tools were used by the person and which were not. Furthermore, UWB tagged tools can be tracked throughout the facility with a UWB-based network reducing the need for situating camera sensors through the entire facility.

UWB tags could also include a motion sensor to detect when the tools were picked up. An action of picking up a tool can trigger the system to engage the computer vision object recognition to extract the visual attributes of the user. Overall, the temporal association of UWB tags with the person reduces the object recognition requirements for the camera system and also enables accurate association of tools with individuals as they are used.

Even though a workshop is used in the example in FIG. 16, other applications and environments can be used without departing from the scope of the present inventive concept. For example, doctors and nurses can be tracked by tagging the various equipment within hospitals and clinics. Though the personnel are not tagged, the equipment is tagged and can be associated with a person as it is being used. Within manufacturing facilities, workers will need to use different tools for their jobs. The tools could be tagged and associated to the user dynamically as described. High risk items such as guns and drug medication could be a particularly appealing application given their potential danger. Handling highly dangerous items can immediately trigger a warning to the system and camera sensors can attempt to identify the user. A history of how a specific user has handled such dangerous items throughout the facility could provide analytical information used to improve processes and handling for safety purposes.

Applications associated with a UWB/Camera RTLS network will now be discussed. The following are example applications which leverage both visual data and UWB/camera localization solutions, but these examples should not be construed as the only applications for which such a system and method would apply:

1. Shopping Mall Application:

UWB enabled smartphones can be used to track patrons in shopping mall areas. Consider a UWB/Camera RTLS network established in a multi-store shopping area and smartphones acting as UWB tags. Doorways provide choke points to associate the smart phone identification with the individual, recording visual attributes such as clothing shape, size, and color, hair styles, and other physical properties. Throughout the shopping mall, the person could be tracked through the combination of UWB and camera sensor data. The system could dynamically update the visual attributes of the person if they change their appearance such as when they go to a hair salon or change into newly purchased clothing at stores. Stores could access the location data of patrons to create spaghetti diagrams and flow behavior of their patrons or heat maps of popular products and displays. Malls could analyze movement analytics and simulate behavior of types of stores coming online. A restaurant may work well in one location based on the historical user flow patterns whereas a bookstore may not. Parents could affix tags to children as additional security to prevent children from getting lost. The UWB/Camera RTLS solution can provide both location data and camera feeds of where a lost child is real time.

2. Emergency Responders Application

Police and other emergency responders could be affixed with body cameras (camera location devices) and UWB location devices. Likewise, emergency responder vehicles could be affixed with location devices. During large emergencies, emergency vehicles may typically swarm together as in the case of a scene of a car accident or high crime. The devices on the emergency personnel and vehicles can form a RTLS network tracking the people and items in and around the vehicles. If the emergency were still ongoing, keeping track of all personnel as in the case of a fire would ensure there were no hurt or wounded personnel left behind. Camera location devices can capture visual attributes of personnel to monitor visually their physical state and health during the event. For example, if the visual attribute of a police officer is showing they are holding a gun or pointing a gun toward someone, the system can alert other personnel in the vicinity that a critical situation is occurring. Other people could be tagged in addition to emergency personnel such as those injured from a car accident or witnesses of a crime. Personnel's movement could be tracked for aberrations in behavior. Odd movements or visual attributes could be flagged for possible safety or health concerns to see if that person needs immediate attention.

3. Factory Check in Application

A UWB/camera RTLS solution can track workers, parts, and tools within a factory environment. When workers check in for the day, they wear a tag, and the RTLS network's camera sensor captures visual attributes of the worker. The worker can then be tracked throughout the factory with the UWB/camera RTLS solution. The system can also dynamically update the visual attributes, detecting if they are holding items in the hand or not. Motion detection both from UWB RTLS tracking and camera-based vision tracking can observe long term, and analytics can be applied to flag any abnormalities in behavior. If there are any issues or ailments the worker is experiencing, the system can generate an alert. For tracking tools and parts, visual attributes of the items can signify whether the item is damaged and needs to be replaced or repaired. Furthermore, a location history of the part can be maintained and referenced as part of quality control in the manufacturing process. In some embodiments, if an item is not where it is supposed to be, outside its designated location or region, the system can send out an alert.

4. Hospital and Retirement Home Staff and Patient Tracking

Tracking and monitoring patients and elderly in both hospitals and retirement homes can provide health-related insight into their well-being. UWB tags could either be sewn into the clothing or worn as a bracelet, ankle bracelet, as a lanyard, or integrated into a shoe or slipper. The patient could be tracked and monitored for changes in their behavior. For example, if the camera sensors had enough resolution, facial expressions could be recorded as visual attributes that might provide insight into well-being of a person. Patterns in movement of a patient could also be an indication of health that could recorded and monitored. If someone falls, the system may note that someone has not moved for a long time, and the visual system could determine that person is on the floor. Staff, nurses, and doctors could also be tracked. For efficient use of resources, knowing where a staff individual is can increase productivity and reduce wait times especially in time-critical situations.

5. Tracking Items and People within Households

A UWB/camera RTLS tracking system could both make locating items easier and provide information on the well-being of both children and pets within the household. Among living items that could be tracked are cats, dogs, children, and parents. Household items such as keys, backpacks, purses, wallets, remote controls, vacuum cleaners, laptops, tablets, coats, etc. may all be candidates for tracking in a camera/UWB RTLS network. Knowing where pets are at any time can provide peace of mind to pet owners. For example, when a family goes on a trip for an extended period of time, the system can update the location of the pets within seconds. A remote application that the family can use on the phone could indicate where the pets are in the house. If a pet accidentally escaped outside, the system would alert accordingly. If the pet's movements were sluggish or irregular, that could be a sign the pet is sick. Visual attributes could also provide insight into the health of the pet as well. Items such as phones, backpacks, and keys are typically held in hand and moved around throughout the day. Camera systems could track the items, and consequently gain insight into the individuals that are holding the items. Visual attributes of the user of the items could be recorded and marked accordingly for health status and safety. For example, if the backpack leaves the house in the morning, the assumption could be that a child may have taken the backpack to school. When the backpack comes back into the home network, the assumption could be that the child has returned from school. Visual attributes can be captured showing that the child is the holder of the backpack. Furthermore, remote controls and phones can get lost in the house quite often. Even when the location of the phone or remote control is approximately known, it may not be readily visible, being wedged between seat cushions of a sofa or within a narrow crevice against the wall. The camera system could record continuously and provide a playback of when the item fell behind the bookshelf or had fallen between the seat cushion, making it easier to find the lost item.

In some embodiments, camera sensors may be connected to a robotic frame such that the camera sensors can be translated and moved within the environment. Camera sensors can be redirected to keep a particular tag or object within its field of view.

In some embodiments, the system may capture more than one image and for each captured image there may be an associated searchable area. The searchable area may include multiple tags (and associated objects). The intersection of the tags in all the searchable areas yields a single unique tag (and associated object). Computer vision may be applied to all the searchable areas and for each searchable area visual attributes may be captured for each recognized object. The same object may be identified across multiple searchable areas by correlating the visual attributes identified in each searchable area of a captured image.

In some embodiments, the camera/UWB tacker device may use the captured images to determine its absolute location. In these embodiments, the camera may capture images of the environment and identify its location based on comparing key features within the environment with key features in the image. The camera/UWB tracker device may include multiple camera sensors and the camera sensors may be oriented such that they are pointing in separate directions.

In some embodiments, all the camera sensors capture images and key features are identified in all of the images to determine the location the tracker device within the environment. The system may know the relative orientation of the camera sensors to each other and the orientation of key features in separate captured images can be determined. Triangulation of the key features amongst all the images can be used to determine the location of the device in the environment.

In some embodiments, 3D digital map of the environment may be created before or during localization is performed. Key features may be extracted from the 3D map and may be compared to the key features from the captured maps for location determination.

In some embodiments, the absolute location as determined from camera/UWB tracker devices aids in the determination of absolute location of UWB tracker devices.

In some embodiments, all of the tracker devices are mobile. For example, vehicles and personnel in the environment may be equipped with tracker devices and vehicles may be equipped with UWB/camera tracker devices capable of determining absolute location.

Figure 17:
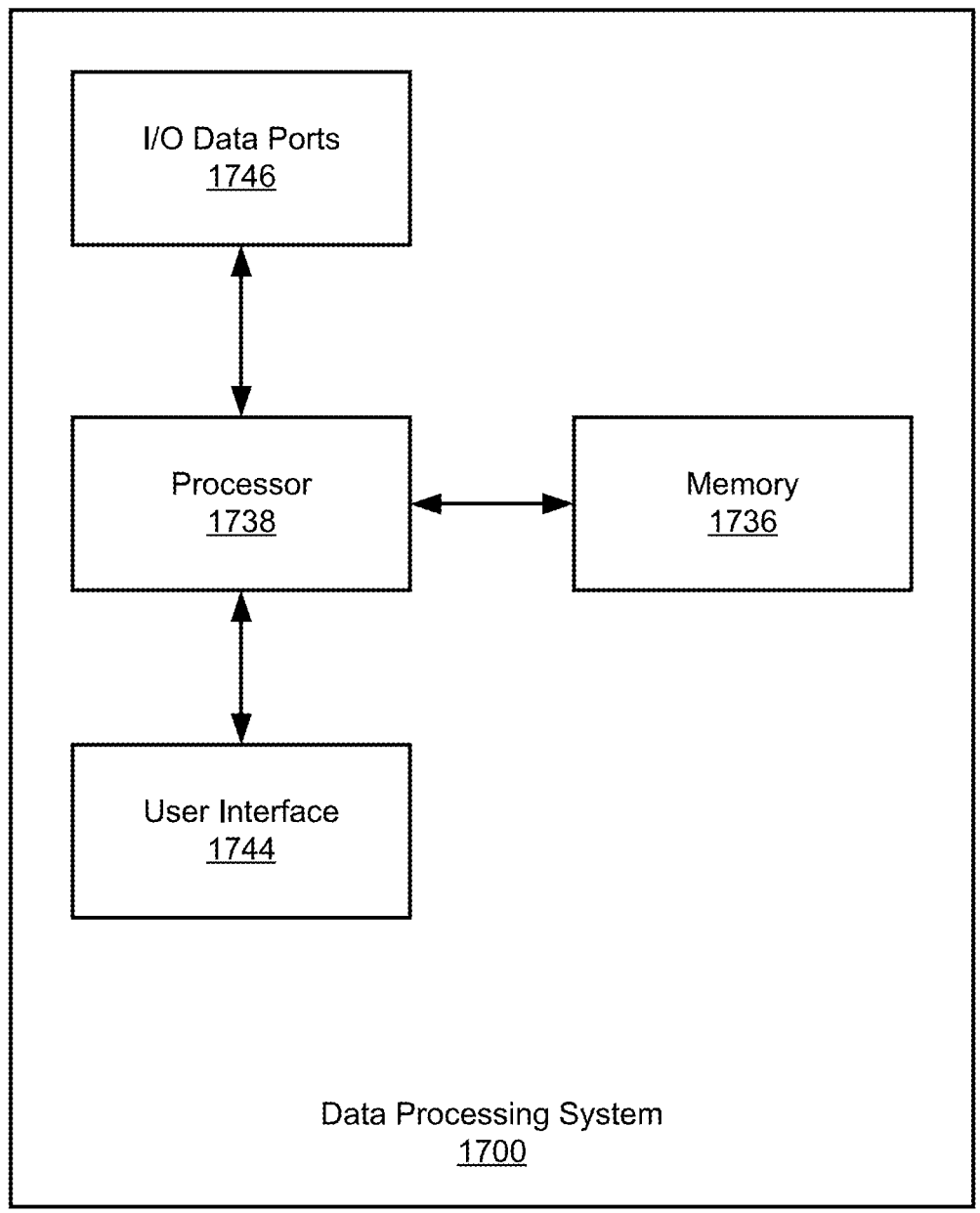
FIG. 17 is a block diagram illustrating a data processing system that may be used in accordance with some embodiments of the present inventive concept.

Embodiments of the present inventive concept manipulate data to calculate various parameters. Accordingly, some sort of data processing is needed to create and store the data. FIG. 17 is a block diagram of an example of a data processing system 1700 suitable for use in the systems in accordance with embodiments of the present inventive concept. The data processing may take place in any of the devices (or all of the devices) in the system without departing from the scope of the present inventive concept. As illustrated in FIG. 17, the data processing system 1700 includes a user interface 1744 such as a keyboard, keypad, touchpad, voice activation circuit or the like, I/O data ports 1746 and a memory 1736 that communicates with a processor 1738. The I/O data ports 1746 can be used to transfer information between the data processing system 1700 and another computer system or a network. These components may be conventional components, such as those used in many conventional data processing systems, which may be configured to operate as described herein.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Furthermore, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Furthermore, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C #, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A real time location system, the system comprising:
one or more ultra-wideband (UWB) sensors positioned in an environment;
one or more image capture sensors positioned in the environment;
wherein the one or more UWB sensors and the one or more image capture sensors are integrated into at least one location device;
wherein the at one location device comprises a UWB location device, a combination UWB/camera location device and/or a camera location device; and
at least one UWB tag associated with an object in the environment to provide a tagged item in the environment and wherein a location of the tagged item is tracked using the at least one location device,
wherein the system is configured to pair the UWB tag with the object using visual attributes and/or characteristics of the object;
wherein the at least one UWB tag contains properties of the object that include visual attributes and/or characteristics of the object;
wherein when a camera recognizes the object, the camera pulls visual attributes from the object and locates a best fit of the pulled visual attributes among UWB tags; and
wherein the located best fit is used to identify an object ID and determine the location of the UWB tag.

2. The system of claim 1, wherein the UWB tag is integrated into a separate device.

3. The system of claim 2, wherein the separate device comprises one of a portable electronic device, a smartphone, a computer and a key fob.

4. The system of claim 1, wherein the UWB tag is affixed to the object and wherein the object comprises one of a stationary object and a moving object.

5. The system of claim 1, wherein if multiple objects are identified within a field of view of a camera image, an object that is closest to a location of the UWB tag within the camera image is selected and paired with the object that is closest.

6. The system of claim 1, wherein the system locates a paired UWB tag in the environment using a UWB network associated with the UWB location device, a camera network associated with the camera location device and/or a combination of a UWB measurements from the UWB network and camera sensor data from the camera network.

7. The system of claim 1:
wherein the object comprises static attributes that do not change over time and a dynamic attribute that changes over time; and wherein the system continually updates the changing visual attributes associated with the object to facilitate camera-based tracking and object recognition of the object.

8. The system of claim 6, wherein the system updates the changing visual attributes of the object associated with the UWB tag by one of:
   determining the location of the object associated with the UWB tag within a field of view of a captured image or video stream;
   identifying the location of the object associated with the UWB tag within the captured image stream using vision processing and a proximity to the UWB tag from the captured image; and
   extracting dynamic visual attributes of the object from the captured image to associate with the object using vision processing.

9. The system of claim 7, wherein the changing visual attributes comprise one or more of clothing type, clothing color, hairstyles, presence or absence of a head covering, type of shoes, eye color, shirt color, height, body shape, presence or absence of a beard and/or presence or absence of eyeglasses.

10. The system of claim 1:
    wherein one or more UWB location devices are provided in a first portion of the environment and one or more camera location devices are provided in a second portion of the environment, different and separate from the first portion of the environment; and
    wherein the one or more UWB location devices are used to track the tagged item in the first portion of the environment and the one or more camera location devices are used to track the tagged item in second portion of the environment.

11. The system of claim 1, wherein one or more UWB location devices and one or more camera location devices are distributed in the environment such that the whole environment is tracked by the one or more UWB location devices and the one or more camera location devices.

12. The system of claim 1, wherein the environment includes both an indoor environment and an outdoor environment.

13. The system of claim 1, wherein a type associated with the object is unknown to the system and wherein the system uses vision processing to determine the type associated with the object.

14. The system of claim 1, wherein the system is configured to:
    overlaying a box around the object paired with the UWB tag on a captured image using vision processing; and
    projecting the UWB tag is projected onto the captured image and overlaying a circle on the capture image, the circle having its center at a location of the UWB tag, wherein the UWB tag associated with the box closest to the circle is paired with the object.

15. The system of claim 1:
    wherein the system stores visual attributes associated objects tagged in the system; and
    wherein a new object is introduced into the environment and stored visual attributes of a pre-existing object match visual attributes of the new object the system determines that then new object and the pre-existing object are a same object.

16. The system of claim 1, wherein the system locates objects in a choke point between a first tracking area of the one or more UWB sensors and a second tracking area of the one or more image capture sensors, the first and second tracking areas being separate and distinct.

17. The system of claim 1, wherein the system accesses external databases to identify the object in the environment.

18. The system of claim 1, wherein the image capture device comprises one of a charge coupled device (CDD), a LiDAR device and a CMOS chip and senses light in one or more of the visible light range; the infrared light range and the ultraviolet light range.

19. The system of claim 1, wherein the UWB tag comprises an enclosure including a processing unit and one or more sensors.

* * * * *